United States Patent
Kato

(10) Patent No.: US 9,143,237 B2
(45) Date of Patent: Sep. 22, 2015

(54) OPTICAL MODULATOR MODULE AND MODULATION METHOD FOR OPTICAL SIGNAL

(75) Inventor: Tomoaki Kato, Tokyo (JP)

(73) Assignee: NEC CORPORATION, Tokyo (JP)

( * ) Notice: Subject to any disclaimer, the term of this patent is extended or adjusted under 35 U.S.C. 154(b) by 2 days.

(21) Appl. No.: 14/346,784

(22) PCT Filed: Sep. 13, 2012

(86) PCT No.: PCT/JP2012/074123
§ 371 (c)(1),
(2), (4) Date: Mar. 24, 2014

(87) PCT Pub. No.: WO2013/042753
PCT Pub. Date: Mar. 28, 2013

(65) Prior Publication Data
US 2014/0233962 A1    Aug. 21, 2014

(30) Foreign Application Priority Data
Sep. 23, 2011  (JP) ................................. 2011-208260

(51) Int. Cl.
*H04B 10/04*   (2006.01)
*H04B 10/516*  (2013.01)
(Continued)

(52) U.S. Cl.
CPC .............. *H04B 10/516* (2013.01); *G02F 1/025* (2013.01); *G02F 1/0327* (2013.01); *G02F 1/225* (2013.01)

(58) Field of Classification Search
CPC .............. H04B 10/516; H04B 10/505; H04B 10/5051; H04B 10/5053; H04B 10/541; H04B 10/556; G02F 1/011; G02F 1/225
USPC .......... 398/183, 188, 192, 193, 194, 195, 198; 385/1, 2, 3; 359/245, 248, 237, 238
See application file for complete search history.

(56) References Cited

U.S. PATENT DOCUMENTS 7,561,806 B2 *  7/2009  Bai ................................ 398/183
8,867,927 B2 * 10/2014  Akiyama et al. .............. 398/188

FOREIGN PATENT DOCUMENTS

JP       H1-185613 A    7/1989
JP       H1-237517 A    9/1989
(Continued)

OTHER PUBLICATIONS

N. Noguchi, K. Tsuzuki et al., "Low Driving Voltage 40 Gbit/s Semiconductor-based Mach-Zehnder Modulator", The Institute of Electronics, Information and Communication Engineers, IEICE Technical Report, OCS2005-64, OPE2005-95, LQE2005-103, Nov. 2005, pp. 41-44, with English Abstract.
(Continued)

*Primary Examiner* — Hanh Phan
(74) *Attorney, Agent, or Firm* — Sughrue Mion, PLLC

(57) ABSTRACT

An optical modulator module includes an optical modulator including an optical waveguide which conducts an inputted optical signal, and m modulator regions on the optical waveguide; and m discrete driving circuits serially connected to one another. The discrete driving circuits include a driving circuit which outputs a signal obtained from a digital input signal with a synchronization signal to one of the modulator regions, and a phase shifting circuit which outputs a signal resulting from giving a delay to a signal branched from the synchronization signal. A discrete driving circuit receives the signal outputted from the phase shifting circuit. Each of the modulator regions includes modulation electrodes, an electric field caused by a modulation electric signal applied to each of the modulation electrodes penetrates by a penetration length d, and every two adjacent modulation electrodes has a distance $L_{gap}$ given by $L_{gap}=2d$.

11 Claims, 10 Drawing Sheets

(51) Int. Cl.
*G02F 1/025* (2006.01)
*G02F 1/03* (2006.01)
*G02F 1/225* (2006.01)

(56) References Cited

FOREIGN PATENT DOCUMENTS

| JP | H2-168227 A | 6/1990 |
|---|---|---|
| JP | H2-170142 A | 6/1990 |
| JP | H3-179939 A | 8/1991 |
| JP | H5-257102 A | 10/1993 |
| JP | H5-289033 A | 11/1993 |
| JP | 2004-102160 A | 4/2004 |
| JP | 2006-65085 A | 3/2006 |

OTHER PUBLICATIONS

S. Akiyama et al., "InP-based High-Speed Mach-Zehnder Modulators with Capacitive-loaded Traveling-Wave Electrodes", The 2006 IEICE General Conference, CBS-2-5, 2006, pp. S-9 to S-10.

T. Kato, et al., "10-Gb/s—80-km operation of full C-band InP MZ modulator with linear-accelerator-type tiny in-line centipede electrode structure directly driven by logic IC of 90-nm CMOS process", Optical Society of America, OFC/NEOEC 2011 ThP4, 2011.

T. Kato, et al., "InP MZ modulator with linear-accelerator-type tiny in-line centipede electrode structure for direct-drive with CMOS logic IC", The Institute of Electronics, Information and Communication Engineers, The 2011 IEICE General Conference, IEICE Technical Report, C-3-30, with English Abstract.

T. Kato et al., "InP MZ modulator with linear-accelerator-type tiny in-line centipede electrode structure for direct-drive with CMOS logic IC", The Institute of Electronics, Information and Communication Engineers, IEICE Technical Report, OPE2011-26, LQE2011-26, Jun. 23, 2011, vol. 111, No. 111 (OPE 2011 15-27), pp. 59-64, with English Abstract. Cited in ISR.

International Search Report for PCT Application No. PCT/JP2012/074123, mailed on Nov. 20, 2012.

* cited by examiner

OPTICAL MODULATOR MODULE AND MODULATION METHOD FOR OPTICAL SIGNAL

This application is a National Stage Entry of PCT/JP2012/074123 filed Sep. 13, 2012, which claims priority from Japanese Patent Application 2011-208260 filed Sep. 23, 2011, the contents of all of which are incorporated herein by reference, in their entirety.

TECHNICAL FIELD

The present invention relates to an optical modulator module and a modulation method for an optical signal.

BACKGROUND ART

With the explosive growth of demands for broadband multimedia communication services, such as the Internet service and a video streaming service, the introduction of a high-density wavelength multiplexed optical fiber communication system which enables realization of a highly reliable long-distance large-capacity communication system is being promoted in trunk-line systems and metro systems. On the other hand, in subscriber-line systems, optical fiber access services are being rapidly promoted. In these communication systems using optical fibers, a reduction of cost for laying optical fibers which are optical transmission lines and improvement of the transmission band utilization efficiency per optical fiber are important. For this reason, various wavelength multiplexing technologies for transmitting a signal light obtained by multiplexing a plurality of signal lights having mutually different wavelengths have been widely used.

With respect to an optical modulator used in an optical transmitter for wavelength multiplexed optical fiber communication systems, it is required that high-speed optical modulation is possible and the degree of dependence on signal light's wavelength is small. Moreover, with respect to such an optical modulator, it is also required that undesired optical phase modulation elements (in the case where an employed modulation method is an optical intensity modulation method) or undesired optical intensity modulation elements (in the case where an employed modulation method is an optical phase modulation method), which lead to a deterioration of received light's waveform at the time of long-distance signal transmission, are suppressed as much as possible. In such applications, a Mach-Zehnder (MZ) optical intensity modulator in which an optical waveguide type MZ interferometer incorporates therein an optical phase modulator of the same optical waveguide type is practical.

Such an MZ optical intensity modulator is produced by using an electro-optic crystal whose refractive index varies in proportion to the intensity of an applied electric field. A currently practically used MZ optical intensity modulator is produced on the basis of a so-called planar optical waveguide circuit in which titanium is diffused on the surface of a substrate made of lithium niobate (LN ($LiNbO_3$)) which is a typical electro-optic crystal. Generally, with regard to the planar optical waveguide circuit, an MZ interferometer is configured such that regions for an optical phase modulator and an optical multiplexer/demultiplexer unit are monolithically integrated on the same LN substrate, and further, an electrode for applying an electric field to the optical phase modulator is provided.

Additionally, developments targeted for an optical waveguide type semiconductor optical phase modulator and an optical waveguide type semiconductor MZ optical modulator which employ a III-V compound semiconductor, such as gallium arsenide (GaAs) or indium phosphide (InP) which is useful in integration of light source elements are being also carried out actively. Such an optical waveguide type semiconductor optical phase modulator and an optical waveguide type semiconductor MZ optical modulator are each configured such that a medium for which a (complex) refractive index relative to signal light varies in accordance with the intensity of an electric field (a multiply mixed crystal of III-V compound semiconductors or a layered structure based thereon) is employed as an undoped core layer. Further, in such an optical waveguide type semiconductor optical phase modulator and an optical waveguide type semiconductor MZ optical modulator, the core layer is inserted between upper cladding layer and lower cladding layer, each having a corresponding one of p-type and n-type electrical conductivities. In this way, a single-mode optical waveguide having a so-called p-i-n type diode structure is achieved. Further, a configuration in which a reverse bias voltage is applied to an optical waveguide configured in such a way is commonly used.

The amplitude of a driving voltage of an MZ optical modulator is in inverse proportion to the length ("modulator region length") of a modulation region (hereinafter, being referred to as "modulator region") of an optical phase modulator in a region where a frequency of the driving voltage is low. For this reason, it is preferable that the modulator region length is made longer in order to achieve lowering of the driving voltage. However, when the modulator region length is increased to a degree same as that of the transmission wavelength of a modulation electric signal, a driving electric signal distribution along an optical signal propagation axis with respect to the modulator region cannot be regarded as a uniform distribution any more. Further, in this case, a relation between an optical modulation efficiency and a length with respect to the modulator region is not a simple inverse proportion relation any more. Further, the capacitance of the modulator region increases as it gets longer, and thus, lengthening the modulator region is not acceptable from a viewpoint of a modulation bandwidth improvement. In order to solve such problems, a so-called traveling-wave type electrode is generally used. In a configuration in which such a traveling-wave type electrode is used, the modulator region is regarded as a transmission line. Further, a modulation electric signal applied to the modulator region is regarded as a traveling wave. Moreover, in order to make a length of an interaction between a modulation electric signal and a modulation target optical signal longer as far as possible, the optical phase modulator is configured such that respective phase velocities of the modulation electric signal and the modulation target optical signal become close to each other. An optical modulator having such a traveling-wave type electrode structure is already widespread in use as a key component of optical transmitters for use in 2.5 Gb/s-40 Gb/s long-distance large-capacity optical fiber communication systems.

Currently, the development of next-generation optical fiber communication system capable of dealing with a further growth of communication demand is required. However, when a binary digital optical intensity modulation method is still continuously employed in such next-generation optical fiber communication systems, it is anticipated that a light waveform deterioration at a receiving end due to the influence of dispersion and a non-linear effect in optical fibers which are transmission lines becomes remarkable. For this reason, it is deemed to be difficult to achieve further improvements of a transmission distance and a transmission speed by using the binary digital optical intensity modulation method. Accordingly, for the purpose of settlement of such problems and further improvements of the transmission distance and the band utilization efficiency, an attempt to apply a multi-level or multiplexed modulation method, such as a quadrature amplitude modulation method or an orthogonal frequency division multiplex modulation method, whose practical uses are preceded by wireless communications, is expected. Hereinafter, the quadrature amplitude modulation method will be referred to as a QAM method. Further, the orthogonal frequency division multiplex method will be referred to as an OFDM method.

In these optical modulation methods, each combination of an amplitude and a phase (or real part and imaginary part) of an optical signal is caused to correspond to modulation data composed of a plurality of bits. As a result, the optical modulation signal becomes a complex optical modulation signal. That is, increasing the band utilization efficiency of an optical modulation code is equivalent to increasing the number of the setting levels with respect to each of amplitude and phase of signal light to a multiple-stage. Further, when such a complex optical modulation signal is generated by using the foregoing multi-level optical modulator, the amplitude of a modulation electric signal therefor need to be set to any appropriate one of amplitudes. As a means for generating an analog electric signal having such any appropriate amplitude in a pseudo manner, generally, an digital-to-analog converter (hereinafter, referred to as a DAC) whose total bit number corresponds to a setting resolution for the analog electric signal is used. However, its conversion speed, which depends on its internal circuit configuration and the like, ends at a speed of around a few gigahertz even on a research and development basis. Further, as a target DAC's operation speed becomes higher, a resolution of the target DAC tends to be further roughened (that is, the total bit number of the target DAC tends to be smaller). With respect to resolutions of present DACs, a DAC capable of realizing a settling time of around several hundreds of picoseconds has a resolution of around 4 to 6 bits (16 to 64 stages). Additionally, it is difficult to realize a DAC capable of realizing a response speed of several gigahertz and outputting a voltage higher than or equal to 1 V. Further, in order to obtain a voltage amplitude enough to drive a multi-level modulator (normally around 3.3 to 7 V), it is necessary to provide a driving circuit which amplifies an analog electric signal outputted from a DAC linearly, that is, with least distortions. Similarly, however, even if the improvements of the characteristics of amplification elements themselves and devices on circuits are performed, it is not easy to perform true linear-amplification on an analog electric signal fluctuating at a high speed of several tens of gigahertz.

Such a velocity mismatch between a modulation target optical signal and a modulation electric signal restricts an effective interaction length between the modulation target optical signal and the modulation electric signal. Thus, there is a disadvantage that, just like a case where there exists an impedance mismatch, the existence of such a velocity mismatch causes a restriction on modulation bandwidth and an increase of an amount of a driving electric current. As described above, when such a traveling-wave type electrode structure is employed in an optical phase modulator or an electric-field absorption type optical intensity modulator of an optical waveguide type to which the p-i-n type diode structure is applied, there occur problems in achievement of lowering of operation voltage and broadening of operation bandwidth.

With respect to these problems, an attempt to satisfy both the phase velocity matching and the impedance matching by changing the layered structure or the electrode structure of such a semiconductor optical modulator has been reported. For example, an attempt to satisfy both the phase velocity matching and the impedance matching by a layered structure of an n-SI-i-n type (SI: semi-insulating semiconductor) or the like in which the p-type semiconductor layer is not included, simultaneously with maintaining the uniformity of the existing layered structure along an optical signal propagation axis has been reported (refer to NPL (non-patent literature) 1).

Moreover, a structure in which a low impedance region having a layered structure based on, for example, a p-i-n structure and a high impedance region having a layered structure based on, for example, an SI-i-n structure are alternately arranged at intervals of a certain length which is sufficiently short as compared with a transmission wavelength of a modulation electric signal has been proposed (refer to NPL 2). Here, in the low impedance region having a layered structure based on a p-i-n structure, the phase velocity of the modulation electric signal is slow and the characteristic impedance is low. On the other hand, in the high impedance region having a layered structure based on an SI-i-n structure, the phase velocity of the modulation electric signal is fast and the characteristic impedance is high. It is described in NPL 2 that this configuration enables realization of apparent satisfactions of both of a phase velocity matching and an impedance matching by weighted-averaging of phase velocities of the both regions and a weighted-averaging of characteristic impedance of the both regions.

Moreover, an optical modulator including a segmented electrode structure in which an electrode of the optical modulator is segmented (refer to PTL (patent literature) 1 to PTL 3). Besides, a structure in which each of segmented electrodes arranged in a modulator has a length resulting from multiplying a unit length by the n-th power of 2 has been proposed (refer to PTL 4 to PTL 7).

As an optical modulator capable of solving such problems, an optical modulator (a linear-accelerator-type in-line electrode structure optical modulator), in which a plurality of short-length optical phase modulators are connected in line a dedicated discrete driving circuit is provided for each of the optical phase modulators and these discrete driving circuits are sequentially driven while synchronized with a modulation target optical signal transmitting through a row of these optical phase modulators, has been proposed (refer to NPL 3 and NPL 4).

CITATION LIST

Patent Literature

[PTL 1] Japanese Unexamined Patent Application Publication No. H05-257102

[PTL 2] Japanese Unexamined Patent Application Publication No. H01-237517

[PTL 3] Japanese Unexamined Patent Application Publication No. H02-170142

[PTL 4] Japanese Unexamined Patent Application Publication No. H01-185613

[PTL 5] Japanese Unexamined Patent Application Publication No. H02-168227

[PTL 6] Japanese Unexamined Patent Application Publication No. H03-179939

[PTL 7] Japanese Unexamined Patent Application Publication No. H05-289033

Non Patent Literature

[NPL 1] Tsuzuki Takeshi, et al., "Low Driving Voltage 40 Gbit/s Semiconductor-based Mach-Zehnder Modulator", IEICE (The Institute of Electronics, Information and Communication Engineers) Technical Report, 2005, OPE 2005-95

[NPL 2] Akiyama Suguru et al., "InP-based High-Speed Mach-Zehnder Modulators with Capacitive-loaded Traveling-Wave Electrodes", The 2006 IEICE General Conference, CBS-2-5

[NPL 3] T. Kato, et al., "10-Gb/s-80-km operation of full C-band InP MZ modulator with linear-accelerator-type tiny in-line centipede electrode structure directly driven by logic IC of 90-nm CMOS process", OFC/NEOEC 2011 ThP4, 2011

[NPL 4] Kato Tomoaki, et al., "InP MZ modulator with Linear-accelerator-type tiny in-line centipede electrode structure for directly driving with Logic IC of 90-nm CMOS process", The 2011 IEICE General Conference, C-3-30

SUMMARY OF INVENTION

Technical Problem

Linearity between an amount of a phase shift applied to a modulation target optical signal while this modulation target optical signal transmits inside an optical phase modulator and a modulation electronic signal applied to the optical phase modulator is important in an estimation of an optical modulation distortion and a design of a driving circuit which become problems when realizing any appropriate multi-level/multiplexed optical modulation. Generally, an amount of a phase shift applied to a modulation target optical signal while this modulation target optical signal transmits through a waveguide type optical phase modulator is proportional to the length of the optical phase modulator, provided that the cross-sectional structure of this optical phase modulator is uniform along an optical signal propagation axis and further an electric field intensity (or a voltage) applied to the optical phase modulator is also uniform along the optical signal propagation axis likewise. Thus, in an optical modulator described in NPL 3 and NPL 4, and in which a plurality of uniform optical phase modulators connected in line along the optical signal propagation axis and which have a short length, an amount of a phase shift applied to a modulation target optical signal transmitting inside the optical modulator is proportional to the total number of optical phase modulators in driven states.

FIG. 7 is a diagram illustrating a configuration of an optical modulator described in NPL 3. An optical modulator 701 includes two single-mode semiconductor optical waveguides 702 and two optical multiplexer/demultiplexer units 703 each having two inputs and two outputs. As shown in FIG. 7, signal light Input is inputted from the left-hand side, and an output signal Output and a monitor output Monitor are outputted from the right-hand side. An optical phase modulator 704 is formed on the two semiconductor optical waveguides 702 which become a pair of delay paths in an MZ interferometer.

The optical phase modulator 704 is segmented into eight modulator regions 705 such that individual minute sections of the semiconductor optical waveguide 702 are demarcated. Further, every two adjacent ones of the modulator regions 705 are electrically isolated by performing ion injection of an element, such as helium or titanium, which obstructs electrical conductivity, into the semiconductor between the every adjacent modulator regions 705.

Here, in order to provide a discrete driving circuit for each of the plurality of modulator regions 705 connected in line and drive this plurality of modulator regions 705 with mutually independent modulation electric signals, every two adjacent ones of the modulator regions 705 needs to be insulated to a degree that does not cause any problem from a viewpoint of a practical use. As a means for this insulation, for example, a method of providing an isolation region of low electrical conductivity which ranges around from 5 to 50 μm between every two adjacent ones of the modulator regions 70 is generally employed. As a method for realizing such a region of low electrical conductivity in an optical modulator based on a semiconductor layer, for example, there is a method of removing a contact layer for obtaining an ohmic contact with an electrode material. A method of ion-injecting an element which obstructs the electrical conductivity of the semiconductor layer, a method of combining these methods, or the like are considered as other methods.

FIG. 8 is a diagram illustrating electric field's penetration from the modulator region 705 to the semiconductor optical waveguide 702 shown in FIG. 7. The vertical axis in FIG. 8 indicates a relative amplitude of an electric field occurring on an area including the modulator region 705 and portions extending in forward and backward directions from the modulator region 705 when the amplitude of the electric field occurring on the modulator region 705 is made 1. The horizontal axis of FIG. 8 indicates a location in a signal light's transmission direction when the center of the modulator region 705 is made an original point (0 μm). In FIG. 8, a case where the modulator region 705 has a length of 40 μm is illustrated. Even though any one of the above methods is used for the isolation between the modulator regions 705, as shown in FIG. 8, an electric field occurring in accordance with an applied modulation electric signal penetrates towards the isolation regions which are adjacent to the modulator region 705 having a length L in the forward and backward directions from the modulator region 705. Here, it is supposed that only one electrode of the length L is formed on part of a waveguide whose cross-section structure is uniform along an optical signal propagation axis. In this case, generally, a distribution $E_y(z)$ which is a distribution of a vertical direction (y direction) element along an optical signal propagation axis (which is made a z-axis) with respect to the penetrated electric field is represented by the following formula:

$$E_y(z) = E_{y,0} \times \exp\{-(|z|-L/2)/d\} \text{(besides } |z|>L/2) \tag{1}$$

Here, $E_{y,0}$ is an electric field in a modulator region. Further, this electric-field element is exponentially attenuated as its location becomes farther from an electrode edge. Further, d is a penetration length which gives a measure of an amount of penetration of an electric field. In order to simplify this argument, it is supposed that this length d does not depend on a frequency of a modulation electric signal applied to the electrode. That is, a length of a modulator region which effectively contributes to operation as the optical phase modulator 704 (this length being referred to as an "effective length" below) becomes (L+2d), and is 2d longer than an actual electrode length.

FIG. 9 is a diagram illustrating an electric field under the state where the same electric potential is given to two electrodes included in the modulator regions 705 and located adjacent to and distanced from each other by a distance $L_{gap}$. The vertical axis in FIG. 9 indicates a relative amplitude of an electric field between the two modulator regions 705 when the amplitude of the electric field occurring on the modulator region 705 is made 1. The horizontal axis of FIG. 9 indicates a location in a transmission direction of signal light when the center of a modulator region located at the left-hand side of FIG. 9 is made an original point (0 µm). As shown in FIG. 9, when two adjacent electrodes are given the same electric potential, an area of the distance L also has an electric potential same as that of the two adjacent electrodes regardless of the magnitude of an isolation resistance between the two adjacent electrodes. Thus, when two adjacent electrodes are given the same electric potential, an effective length contributing to operation as the optical phase modulator 704 becomes $(d+L)+L_{gap}+(L+d)=2L+L_{gap}+2d$. Similarly, when m electrodes which adjoins with the distance $L_{gap}$ and each of which has a length L are given the same electric potential, obviously, an effective length contributing to operation as the optical phase modulator 704 becomes $mL+(m-1) L_{gap}+2d$.

That is, as far as at least m consecutive modulator regions 705 are caused to be driven, every time when the total number of the modulator regions 705 is incremented by one, an effective length contributing to operation as the optical phase modulator 704 increases by $(L+L_{gap})$. For this increment, the effective length is linear relative to the total number of the modulator regions 705 in driven states. In this case, a straight line representing a relation between the effective length and the total number of the modulator regions 705 in driven states does not pass through an original point.

FIGS. 10A to 10C are diagrams each illustrating an electric potential distribution in an isolation region between two adjacent modulator regions 505 in the optical phase modulator 704. FIG. 10A illustrates the electric field distribution in a case where only a modulator region at the left-hand side is driven. FIG. 10B illustrates the electric field distribution in a case where only a modulator region at the right-hand side is driven. FIG. 10C illustrates the electric field distribution in a case where modulator regions at the both sides are driven.

Next, a case where electrodes are driven with an electric potential V on an every other one basis will be considered. Here, electrodes each not in a driven state are not electrically open but are supplied with a voltage of a minimum one of voltage stages which the discrete driving circuit is capable of outputting. In order to simplify this argument, supposing that a relation $d \ll L_{gap}$ is satisfied, the effective length of the optical phase modulator becomes $m(L+2d)$. That is, when the electrodes are driven with an electric potential V on an every other one basis, the effective length is linear relative to the total number of electrodes in driven states. Further, a straight line representing a relation between the effective length and the total number of optical phase modulators in driven states passes through the original point. This relation is satisfied in not only a case where electrodes are driven with the voltage V on an every other one basis, but also a case where m electrodes which are not adjacent to one another are driven.

In the case where it is merely considered only to divide an amount of a phase shift applied to a modulation target optical signal into multiple stages of phase-shift amounts, basically, it is possible to realize this multiple stages of the phase-shift amounts by means of the former driving circuit configuration in which electrodes of m consecutive optical modulators are driven. That is, it is unnecessary to employ the latter driving circuit configuration in which a plurality of electrodes that are not adjacent to one another are driven.

Here, a case where, with respect to the stages of optical phase-shift amounts, there exist N cases of 0-th stage to (N−1)th stage, and an appearance frequency of each of the stages is uniform (that is, an appearance frequency of every stage is 1/N) is considered. In this case, in the former driving circuit configuration in which electrodes of m consecutive optical modulators are driven, in the case where a stage number of the stages of optical phase-shift amounts is close to 0, any modulator region which is in a driven state and which is subjected to long-time application of a modulation electric signal deteriorates a corresponding portion of an optical waveguide to a greater degree. The configuration in which electrodes of m consecutive optical modulators are driven has a simple circuit configuration and can be easily controlled. However, this configuration is not preferable from an aspect of reliability of modulator regions.

For this reason, driving control may become slightly complicated but a device which enables averaging of a driven-state of each of the modulator regions connected in line is necessary from a viewpoint of reliability. Then, in the case where modulation control devised so as to realize averaging of such a driven-state is performed, there appears a state where one portion composed of p driven optical regions (0≤p≤m) each being consecutive to one of the other ones thereof and another portion composed of (m−p) driven modulator regions which are not adjacent to one another are mixed, and moreover, this p always changes.

However, as described above, an effective length of the part in which m consecutive modulator regions in driven states are driven is $mL+(m-1) L_{gap}+2d$. Meanwhile, an effective length of the part in which m modulator regions which are not adjacent to one another are driven is $m(L+2d)$. That is, depending on whether a driven modulator-region set consists of consecutive driven modulator regions or only one driven modulator region, the effective length of the driven modulator-region set is different.

For this reason, in the case where, when generating any appropriate multi-level/multiplexed optical modulation code by using a traveling-wave type in-line electrode structure, the foregoing control which allows averaging of driven-state rates is performed, a discrepancy in linearity is likely to arise between the total number of electrodes in driven states and amounts of phase shifts applied to a modulation target optical signal. Moreover, the discrepancy dynamically changes. It is apprehended that this phenomenon becomes a cause which distorts multi-level/multiplexed optical modulation characteristics along with future ascending of a degree of multiple values or a degree of multiplexing with respect to a modulation target optical signal.

However, the above patent literatures and non-patent literatures disclose no technology for solving the problem that, when generating multi-level/multiplexed optical modulation codes by using a traveling-wave type in-line electrode structure, a discrepancy in linearity is likely to arise in a modulation target optical signal.

An object of the present invention is to provide a broadband and low-driving-voltage optical modulator module capable of generating a multi-level/multiplexed optical modulation signal with less distortion.

Solution to Problem

An optical modulator module according to the present invention includes an optical modulator including an optical waveguide which conducts an inputted optical signal, and m modulator regions (m being an integer satisfying 2 m) which are arranged so as to align on the optical waveguide and which modulate the optical signal; and m discrete driving circuits that are serially connected to one another. An i-th one of the discrete driving circuits (i being an integer satisfying 1≤i≤m) includes a driving circuit which outputs a signal obtained by amplifying a signal resulting from synchronizing a digital input signal with a synchronization signal to an i-th one of the modulator regions, and a phase shifting circuit which outputs a signal resulting from giving a delay to a signal branched from the synchronization signal. A j-th one of the discrete driving circuits (j being an integer satisfying 2≤j≤m) receives, as the synchronization signal, the signal outputted from the phase shifting circuit included in a (j−1)th one of the discrete driving circuits. The modulator regions include a corresponding one of a plurality of modulation electrodes, supposing that a penetration length denoted by d is the penetration length of an electric field caused by a modulation electric signal applied to the modulation electrodes in a transmission direction of the optical signal, the distance between every two adjacent ones of the modulation electrodes $L_{gap}$ is given by $L_{gap}$=2d.

A modulation method for an optical signal, according to a second aspect of the invention, includes causing an i-th one of m discrete driving circuits (i and m being integers satisfying 1≤i≤m, and 2≤m) which are connected in line to generate a signal obtained through amplification of a signal resulting from synchronizing a digital input signal with a synchronization signal; causing a driving circuit to output the signal obtained through amplification to an i-th one of modulator regions which are formed on an optical waveguide of an optical modulator, wherein the modulator regions include a corresponding one of modulation electrodes, an electric field caused by a modulation electric signal applied to the modulation electrodes penetrates in a transmission direction of the optical signal by a penetration length, and supposing that the penetration length is denoted by d, a distance $L_{gap}$ between every two adjacent ones of the modulation electrodes is given by $L_{gap}$=2d; causing a phase shifting circuit to output a signal resulting from giving at least a delay to a signal branched from the synchronization signal; and inputting a signal outputted from the phase shifting circuit of a (j−1)th one of the m discrete driving circuits (j being an integer satisfying 2≤j≤m) to an j-th one of the m discrete driving circuits.

Advantageous Effects of Invention

The present invention brings an effect that a broadband and low-driving-voltage optical modulator module capable of generating a multi-level/multiplexed optical modulation signal with less distortion is realized.

DESCRIPTION OF EMBODIMENTS

Figure 1:
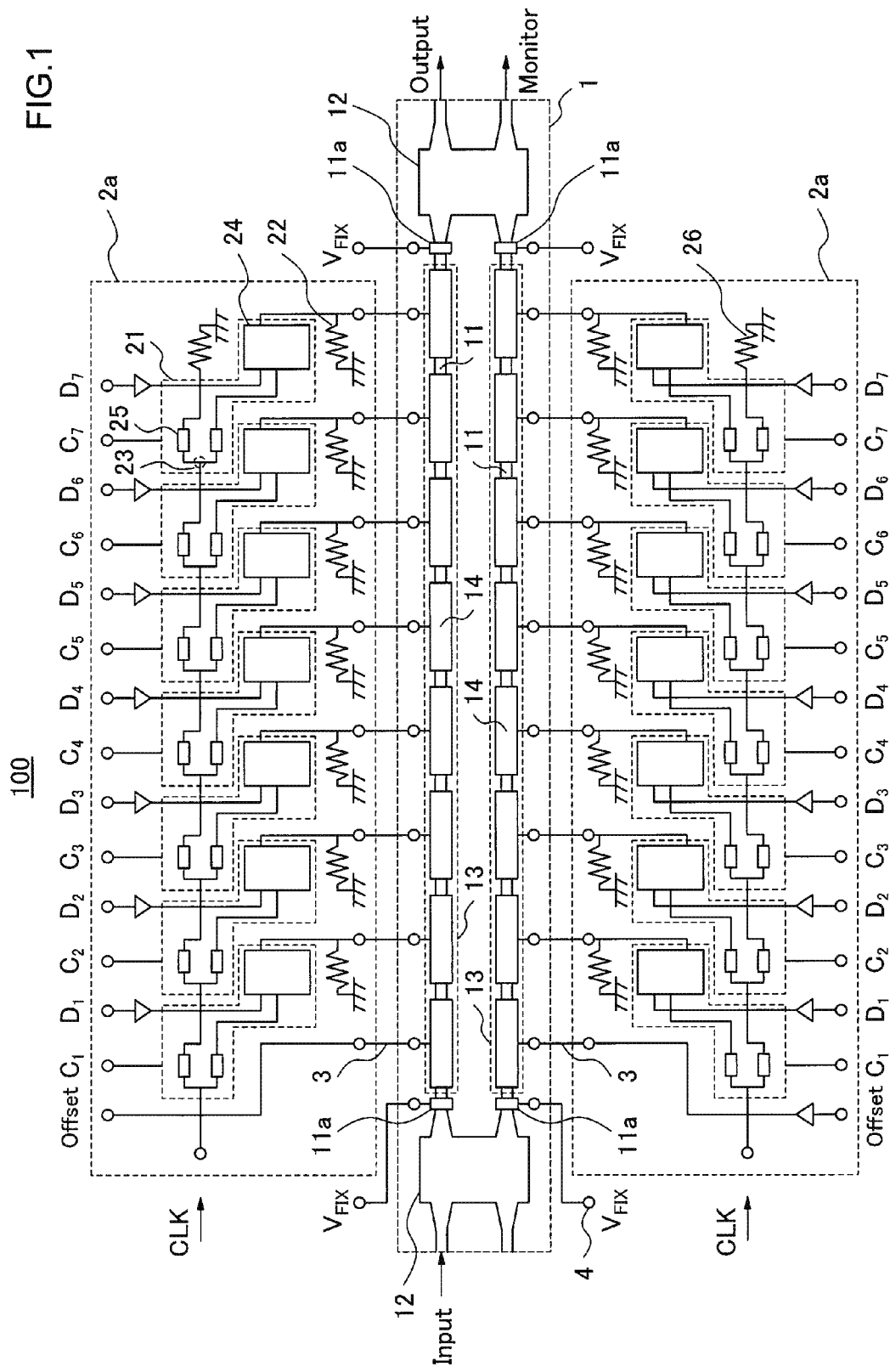
[FIG. 1] A diagram illustrating a configuration of a multi-level optical modulator module of a first exemplary embodiment

First, characteristics common to optical modulator modules according to individual exemplary embodiments and examples to be described below will be described. With respect to an optical modulator module to be described in each of the following exemplary embodiments, in the optical modulator 701 shown in FIG. 7, a relation between a length $L_{gap}$ of each of isolation regions are adjacent to the modulator region 705 in the forward and backward directions from the modulator region 705, and a penetration length d of an electric field penetrating into a portion between every two adjacent ones of the modulator regions 705 is represented by $L_{gap}$=2d. In addition, $L_{gap}$ and 2d are not necessary to be completely the same with each other, and a tolerable amount of a difference between $L_{gap}$ and 2d is determined in accordance with a performance of a required optical modulator.

As described above, in the case where the same electric potential is applied to m electrodes whose length are L and adjoin with a distance $L_{gap}$, an effective length which contributes to operation as an optical phase modulator is represented by mL+(m−1) $L_{gap}$+2d. Here, supposing that the relation $L_{gap}$=2d is satisfied, the following formula (2) is obtained as follows:

$$mL + (m-1)L_{gap} + 2d = mL + 2(m-1)d + 2d \qquad (2)$$
$$= m(L + 2d)$$

That is, through the introduction of the relation $L_{gap}$=2d, in the case where m consecutive modulator regions are driven, every time when the total number of modulator regions in driven states is incremented by one, the effective length of the optical phase modulator increases by a length (L+2d). This relation coincides with a relation between the effective length and the total number of modulator regions in driven states in the case where m electrodes which are not adjacent to one another are driven.

As a result, an effective length in the case where there occurs a state where one portion composed of p driven optical regions (0≤p≤m) each being consecutive to one of the other ones thereof and another portion composed of (m−p) driven modulator regions which are not adjacent to one another mixed, is represented by the following formula (3) as follows:

$$\{pL+(p-1)L_{gap}+2d\}+(m-p)(L+2d)= \qquad (3)$$
$$p(L+2d)+(m-p)(L+2d)=m(L+2d)$$

The formula (3) indicates that, regardless of whether or not a plurality of modulator regions in driven states are adjacent to one another, the effective length is constantly kept linear relative to the total number of the optical phase modulators in a driven state. Further, even when p dynamically changes under the state where the portions composed of (m–p) driven modulator regions which are not adjacent to one another are mixed, the formula (3) is satisfied.

Figure 7:
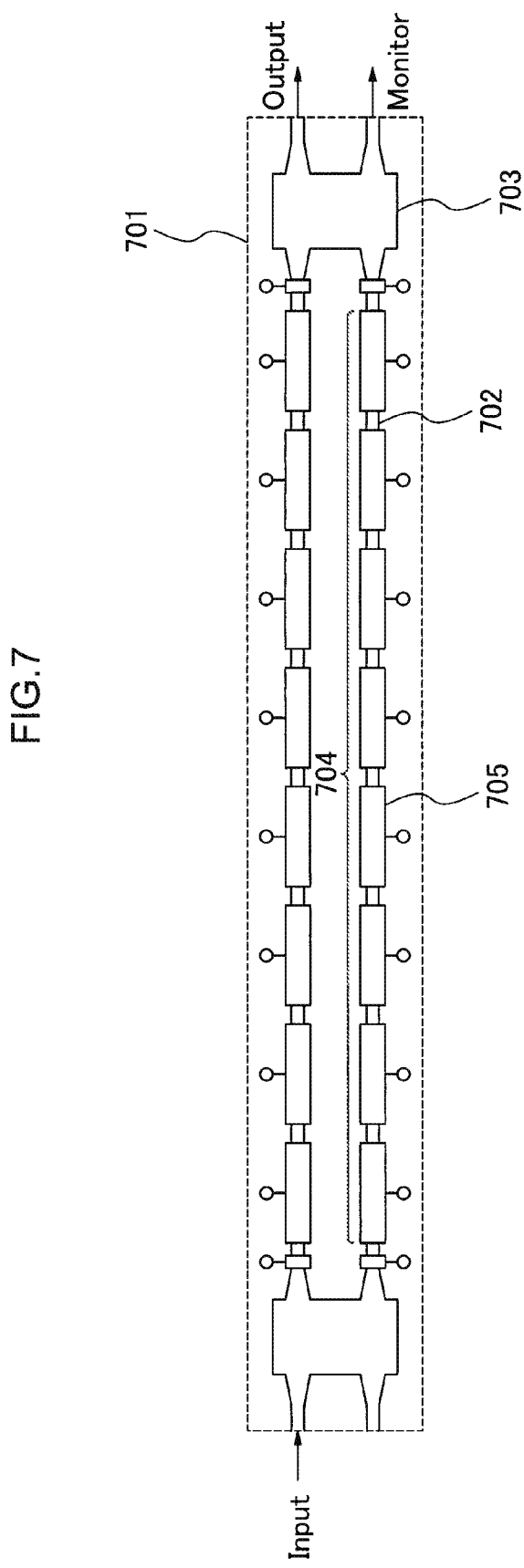
[FIG. 7] A diagram illustrating a configuration of a linear-accelerator type in-line electrode structure optical modulator related to the present invention
Figure 8:
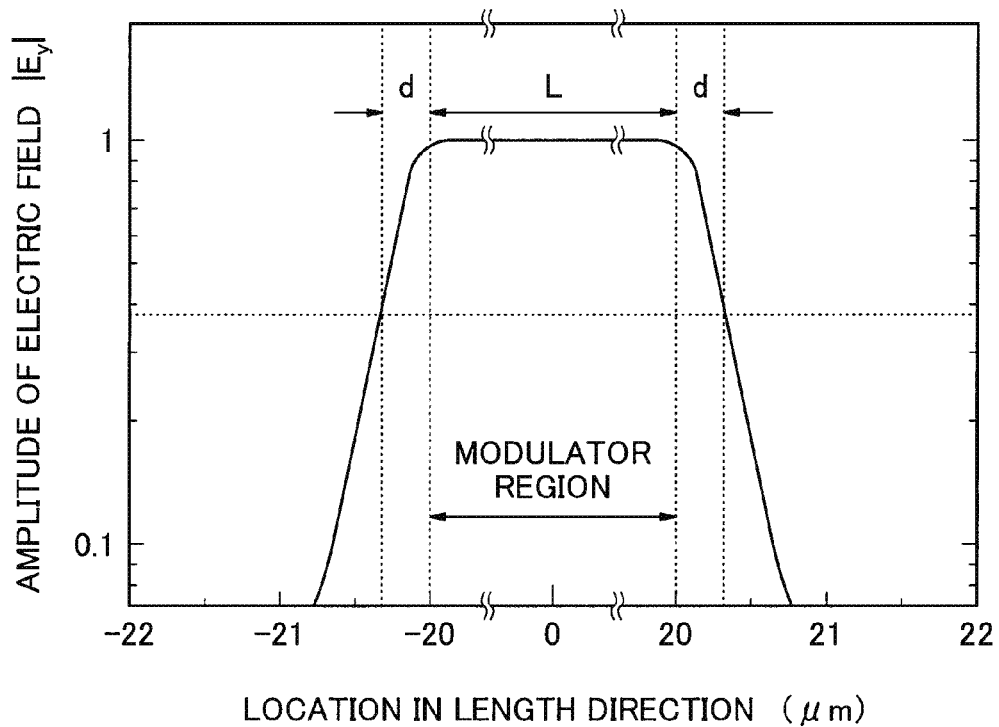
[FIG. 8] A diagram illustrating penetration of an electric field from a modulation region
Figure 9:
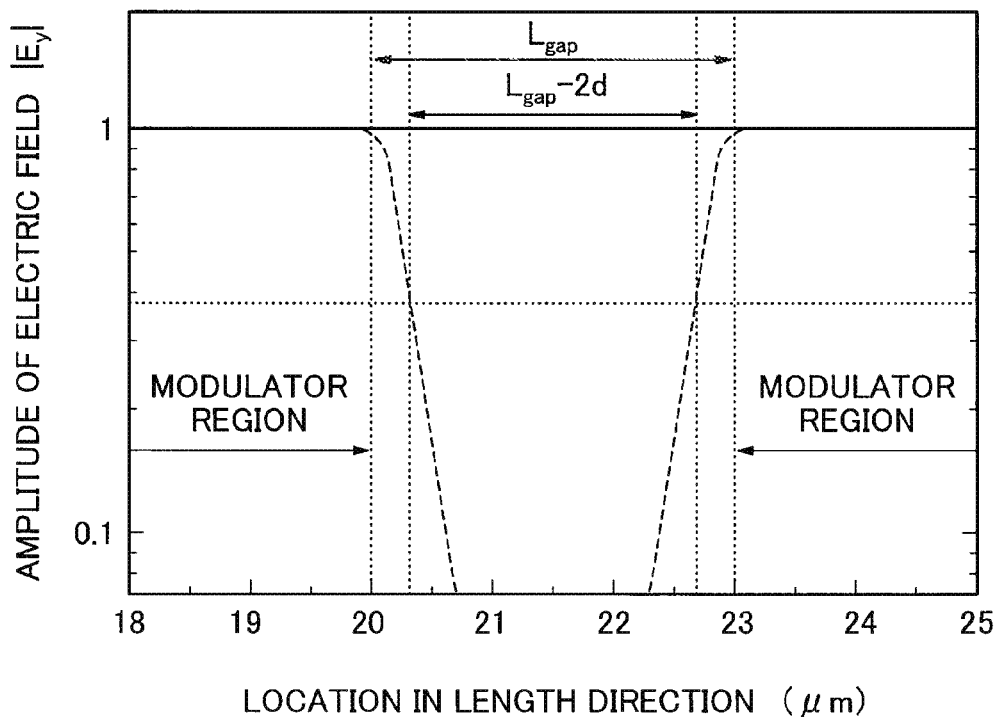
[FIG. 9] A diagram illustrating an electric field under the state where the same electric potential is given to two electrodes which are located adjacent to and distanced from each other by a distance $L_{gap}$
Figure 10A:
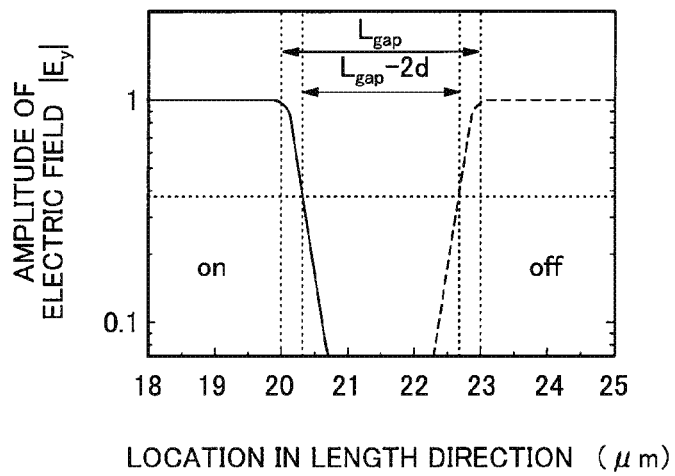
[FIG. 10A] A diagram illustrating an electric field distribution in an isolation region when two adjacent modulator regions is driven.
Figure 10B:
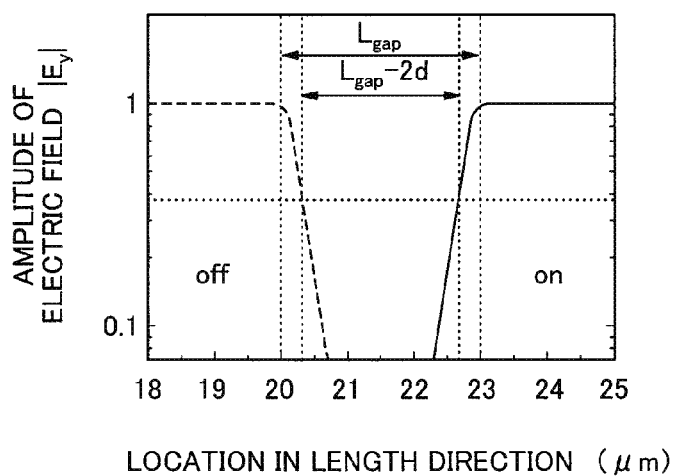
[FIG. 10B] A diagram illustrating an electric field distribution in an isolation region when two adjacent modulator regions is driven.
Figure 10C:
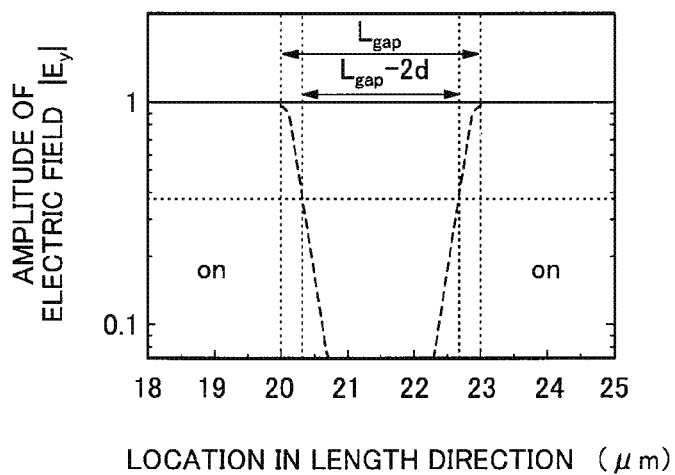
[FIG. 10C] A diagram illustrating an electric field distribution in an isolation region when two adjacent modulator regions are driven.

This feature guarantees the linearity of optical modulation characteristics which becomes a key factor when applying the optical modulator shown in FIG. 7 to multi-level optical modulation and is significantly important from a viewpoint of practical use. Naturally, this linearity indicates that, definitely in one optical phase modulator, the linearity is favorable between the total number of optical phase modulators in driven states and the effective length.

Figure 11A:
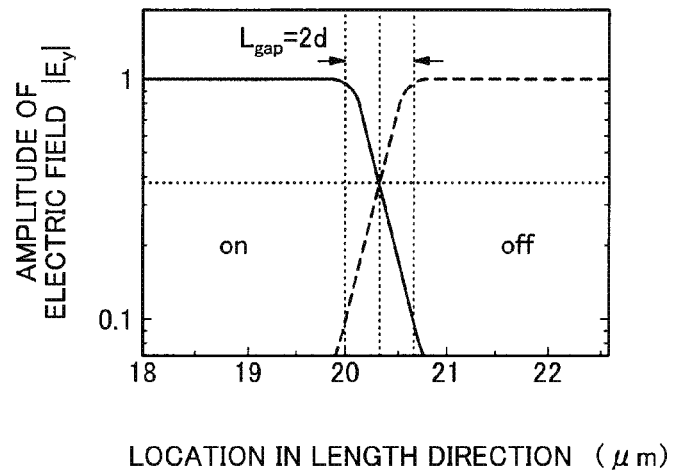
[FIG. 11A] A diagram illustrating an electric field distribution in an isolation region between adjacent modulator regions in the case of $L_{gap}$=2d.
Figure 11B:
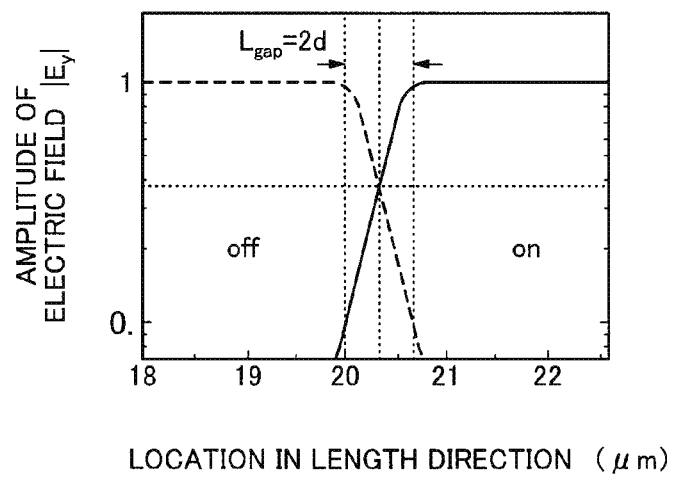
[FIG. 11B] A diagram illustrating an electric field distribution in an isolation region between adjacent modulator regions in the case of $L_{gap}$=2d.
Figure 11C:
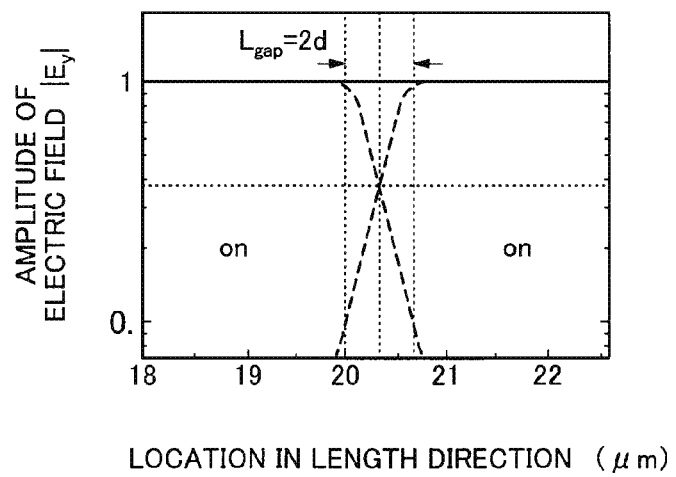
FIG. 11C A diagram illustrating an electric field distribution in an isolation region between adjacent modulator regions in the case of $L_{gap}$=2d.

FIGS. 11A to 11C are diagrams each illustrating an electric potential distribution in an isolation region between two adjacent modulator regions 705 when the relation $L_{gap}=2d$ is satisfied in the optical modulator 703 shown in FIG. 7. FIG. 11A illustrates an electric field when only a modulator region at the left-hand side is driven. FIG. 11B illustrates an electric field when only a modulator region at the right-hand side is driven. FIG. 11C illustrates an electric field when modulator regions at the both sides are driven.

As described above, d is a penetration length which gives a measure of an amount of penetration of an electric field. d varies depending on an effective film thickness t of a modulation electrode. Thus, d is also determined from the effective film thickness t of the modulation electrode, and, for example, a relation between d and t may be made such as d is around 0.8t. In addition, a value of d and a range within which its variation is tolerable may be different depending on the performance and the structure of a required modulator.

Actually, the configuration of the modulator regions 705 in which the above relation $L_{gap}=2d$ is satisfied is applied to modulator regions of, for example, an MZ type optical modulator. In this case, a relation between an actual optical modulation output signal and the total number of modulator regions in driven states becomes sine functional relation because of phase difference dependency of extinction characteristic. Accordingly, a favorable linearity between the total number of the modulator regions in driven states and the optical modulation output signal is not obtained as it is. In this regard, however, this phenomenon is a problem which needs to be settled even in a currently well-known LN based multi-level optical modulator and which is specific to a extinction characteristic of an MZ interferometer. Further, since a behavior of the phenomenon can be expressed by using a mathematical formula, and there is no dynamic change in the phenomenon, this problem can be sufficiently dealt with by a device, such as digital signal processing and does not lead to any trouble in practical use.

As described above, with respect to an optical modulator module described in each of subsequent exemplary embodiments, in an optical modulator which is superior in characteristics of downsizing, higher-speed processing and lower-voltage driving, a relation between the length $L_{gap}$ of each of isolation regions each adjacent to a corresponding one of anterior and posterior portions of each of modulator regions and a penetration length "d" of an electric field penetrating into the above isolation region is made a relation represented by $L_{gap} \approx 2d$. Thereby, regardless of whether or not a plurality of modulator regions in driven states are adjacent to one another, the effective length of the optical modulator regions is constantly kept linear relative to the total number of optical phase modulators in driven states. It is expected that an optical modulator module described in each of subsequent exemplary embodiments becomes a key component when building an optical communication system based on a multi-level optical modulation method whose future practical use is desired.

In each of exemplary embodiments described below, a wideband optical modulation characteristic which is an advantage of the traveling-wave type electrode structure optical modulator is not lost. Meanwhile, in the traveling-wave type electrode structure optical modulator, there exists a trade-off between an optimal design as an optical waveguide and an optimal design for realizing a matching between a phase velocity and lowering of a modulation efficiency due to attenuation of a modulation electric signal at an electrode posterior edge. However, in each of subsequent exemplary embodiments, this trade-off is dissolved and it becomes possible to improve design flexibility with respect to a corresponding one of optical modulators. Moreover, according to each of subsequent exemplary embodiments, it becomes possible to provide a small-size, broadband and low-driving-voltage optical modulator module which is capable of generating any appropriate multi-level optical modulation signal merely by inputting digital signals thereto.

(First Exemplary Embodiment)

Hereinafter, exemplary embodiments of the present invention will be described with reference to the drawings.

FIG. 1 is a diagram illustrating a configuration of a multi-level optical modulator module 100 according to a first exemplary embodiment of the present invention. Hereinafter, a configuration of the multi-level optical modulator module 100 will be described. As shown in FIG. 1, the multi-level optical modulator module 100 includes an optical modulator 1 and two integrated circuits 2a.

The optical modulator 1 includes an MZ interferometer structure provided with two single-mode semiconductor optical waveguides 11 and optical multiplexer/demultiplexer units 12 each having two inputs and two outputs. As shown in FIG. 1, signal light Input is inputted from the left-hand side, and an output signal Output and a monitor output Monitor are outputted from the right-hand side. An optical phase modulator 13 is formed in each of the two semiconductor optical waveguides 11 which is a pair of delay paths of the MZ interferometer.

The semiconductor optical waveguide 11 includes a core layer and cladding layers which insert the core layer between the cladding layers from upper and lower directions. In the semiconductor optical waveguide 11, applying an electric field to the core layer (not illustrated) or injecting an electric current into the core layer causes a change of a refractive index relative to optical signal propagating along the core layer. Incidentally, in the semiconductor optical waveguide 11, a lateral-taper-structure spot-size converter (not illustrated) is provided in the vicinity of each of both cleaved edge faces of the optical modulator 1, and a low reflection film (not illustrated) is formed on each of the both cleaved edge faces thereof.

The optical phase modulators 13 is segmented into modulator regions 14 whose total number is n (n being an integer satisfying n>2) such that individual minute sections of the semiconductor optical waveguide 11 are demarcated. For example, the optical phase modulator 13 is segmented into the modulator regions 14 whose total number is the h-th power of 2, that is, n=$2^h$ (h being an integer satisfying h>2). FIG. 1 illustrates a case where h=3. That is, the optical phase modulator 13 includes the modulator regions 14 whose total number is eight. Further, every two adjacent ones of the modulator regions 14 are electrically isolated by performing ion injection of an element, such as helium or titanium, which obstructs electrical conductivity, into a semiconductor portion between the modulator regions 14.

Here, an i-th one of the modulator regions 14 from the input side of the optical modulator 1 includes a modulation electrode having a length of Li (i being a natural number satisfying 2≤i≤m=$2^h$−1). Further, a distance by which a modulation electric signal applied to the above modulation electrode penetrates in each of forward and backward directions extending from the modulator region 4 along an optical signal propagation axis is d, and a distance between modulation electrodes of every two adjacent ones of the modulator regions 14 is 2d.

The integrated circuits 2a include m discrete driving circuits 21 and m terminators 22 (m being an integer satisfying m≤n). FIG. 1 illustrates a case where the total number of the discrete driving circuits 21 and that of the terminators 22 is 7 (=$2^3$−1).

The discrete driving circuit 21 is a circuit block including a branch 23, a driving circuit 24 and a phase shifting circuit 25. The branch 23 is a branch which divides an inputted clock signal CLK into two clock signals and which has one input and two outputs.

The driving circuit 24 includes a D-flip-flop circuit (a D-FF circuit) and further, includes functions of performing processes of a delay adjustment, an amplitude adjustment, a bias adjustment and a waveform shaping on an output signal from the D-FF circuit. The D-FF circuit included in the driving circuit 24 causes identified digital input signals $D_1$ to $D_7$ to be synchronized with one of the two clock signals divided from the clock signal CLK. Further, the driving circuit 24 performs processes of the delay adjustment, the amplitude adjustment, the bias adjustment and the waveform shaping on the output signal from the D-FF circuit, and outputs a signal having been subjected to these processes to the modulator region 14. The functions of processes of the delay adjustment, the amplitude adjustment, the bias adjustment and the waveform shaping can be controlled by external electric signals (denoted by $C_1$ to $C_7$ in FIG. 1).

The phase shifting circuit 25 outputs the other one of the two clock signals divided from the clock signal CLK to a subsequent stage of the discrete driving circuits 21. Similarly, the phase shifting circuit 25 has the functions of the delay adjustment, the amplitude adjustment and the waveform shaping, and further, just like the driving circuit 24, allows these functions to be controlled by an external electric signal.

An offset signal Offset for adjusting an offset of the phase of a modulation target light signal is inputted to a first one of the modulator regions 14 when counted from the input side. Further, a signal output of an i-th one of the discrete driving circuits 21 and an (i+1)th one of the modulator regions 14 when counted from the input side are connected to each other via a driving signal wiring 3. The driving circuit 24 may perform amplitude adjustments so as to apply a driving voltage of substantially same amplitude to each of the modulator regions 14.

The terminator 26 is connected to a last one of the discrete driving circuits 21 when counted from the input side, and terminates a clock signal which has been transmitted through the individual discrete driving circuits 21 between a ground electric potential and the last one of the discrete driving circuits 21.

A terminator 22 is connected between the driving signal wirings 3 and a common ground (not illustrated) in order to suppress a waveform distortion and a band deterioration due to a reflection of a signal output. Incidentally, the impedance of the terminator 22 is matched with the output impedance of the discrete driving circuit 21 connected thereto.

The semiconductor optical waveguide 11a smoothly connects between the optical multiplexer/demultiplexer unit 12 and the modulator region 14 adjacent to this optical multiplexer/demultiplexer unit 12. The semiconductor optical waveguide 11a is connected to an electric potential fixing means 4 having an electric potential $V_{FIX}$. In this way, the optical multiplexer/demultiplexer unit 12 and the semiconductor optical waveguide 11a are connected to an external constant voltage source, and the electric potential of the optical multiplexer/demultiplexer unit 12 and the semiconductor optical waveguide 11a are kept to a constant electric potential regardless of the magnitude of a driving signal. The electric potential $V_{FIX}$ is applied in order to suppress the occurrence of a phenomenon in which a modulation bandwidth increases in a lower frequency band because a modulation signal element penetrating into the optical multiplexer/demultiplexer unit 12 and the semiconductor optical waveguide 11a causes the optical multiplexer/demultiplexer unit 12 and the semiconductor optical waveguide 11a to contribute to optical modulation.

Next, operation of the multi-level optical modulator module 100 will be described. First, the clock signal CLK inputted to the multi-level optical modulator module 100 is divided into two clock signals CLK by the branch 23. One of the divided clock signals CLK is led to a clock signal input of the discrete driving circuits 21. The discrete driving circuits 21 logically identifies digital input signals $D_1$ to $D_7$ while synchronized with this divided clock signal CLK and drives a corresponding one of the modulator regions 14 in accordance with the result of the identification.

On the other hand, the other one of the divided clock signals CLK is led to a subsequent one of the discrete driving circuits 21 via the phase shifting circuit 25. The repetition of these operations makes it possible for the discrete driving circuits 21 whose total number is ($2^h$−1) to sequentially drive a corresponding one of the modulator regions 14 connected to the each of the discrete driving circuits 21.

Incidentally, so that a period of time needed for the clock signal CLK to pass through one stage of the phase shifting circuits 25 may become equal to a period of time needed for a modulation target light signal inputted to the multi-level optical modulator module 100 to pass through one stage of the modulator regions 14, a delay of the phase shifting circuit 25 is adjusted. Alternatively, so that a delay of each of the driving signal wiring 3 may become constant, a delay of the driving circuits 24 is adjusted. For example, a delay of the phase shifting circuit 25 in an i-th one of the discrete driving circuits 21 is realized by being made substantially the same as a time lag of signal light which passes through a distance between the midpoint of an (i−1)th one of the modulator regions 14 and a midpoint of an i-th one of the modulator regions 14. In this way, a pseudo traveling wave operation in the multi-level optical modulator module 100 can be realized. Thus, since one of restrictions on the phase velocity matching and the impedance matching which are contrary to each other from a viewpoint of a layered structure design for a waveguide type optical modulator can be abated, it becomes possible to apply an improved degree of design freedom to design areas different from the phase velocity matching and the impedance matching.

Here, as described above, the multi-level optical modulator module 100 is produced such that a distance by which a modulation electric signal penetrates in each of forward and backward directions extending from the modulator regions 14 along the optical signal propagation axis is a length ΔL, and a distance between modulation electrodes of every two adjacent ones of the modulator regions 14 is a length 2ΔL.

Accordingly, in the multi-level optical modulator module 100, regardless of whether or not a plurality of modulator regions 14 in driven states are adjacent to one another, a linearity between the effective length and the total number of the plurality of modulator regions 14 in driven states is kept favorable. For this reason, in the multi-level optical modulator module 100, notwithstanding any change in the total number and/or the positions of the modulator regions 14 in driven states, it is possible to suppress unnecessary optical phase modulation between every two adjacent modulator regions. As a result, the multi-level optical modulator module 100 brings about an advantageous effect that it is possible to realize a broadband and low-driving-voltage optical modulator module which is capable of generating a multi-level/multiplexed optical modulation signal with less distortion.

Incidentally, in general, the amplitude of a modulation electric signal transmitting along the longitudinal-axis of a traveling-wave type optical modulator shown in FIG. 1 exponentially decreases. Thus, in the case where the length of an optical modulator is made long, a portion beyond a certain length does not mostly contribute to optical modulation operation substantially. Accordingly, an effective optical modulation factor of the traveling-wave type optical modulator is saturated at a certain value. When an attenuation constant of the amplitude of a modulation electric signal transmitting along the longitudinal axis of a traveling-wave type electrode structure is made $\alpha_m$, an effective optical modulator length $L_{\mathit{eff}}$ which causes an optical modulation factor to reach its saturation point is given by the reciprocal number thereof ($1/\alpha_m$).

In the structure of the first exemplary embodiment, for each of the modulator regions 14 other than the modulator region 14 at an input edge portion where an offset is inputted, a corresponding one of the discrete driving circuits 21 is provided. Thus, it is possible to make the length of the optical modulator longer beyond the foregoing restriction that the effective optical modulator length of an optical modulator is to be $1/\alpha_m$.

Moreover, in the multi-level optical modulator module 100, an optical modulation factor per segmented optical modulator region is suppressed to a relatively small one. For this reason, it becomes possible to realize lowering of a driving voltage. Thus, it becomes unnecessary to provide a driving circuit which generates a driving voltage having large amplitude, has difficulty of compatibility with broadening of operation bandwidth and has many problems from an aspect of reliability. This leads to suppression of an amount of an output current of a transistor used for an output stage of the discrete driving circuits to a relatively small amount, and is also advantageous from a viewpoint of the improvement of an operation speed, viewpoint of the suppression of a driving signal's waveform distortion and viewpoint of the realization of enhancement of reliability.

As described, the divided modulator regions 14 have small capacitance, and thus, it can be regarded as a concentrated-parameter circuit element (a concentrated-parameter type optical modulator). Moreover, a wiring connecting between the discrete driving circuit 21 and the modulator region 14 is sufficiently short as compared with a transmission wavelength at a frequency of the modulation electric signal. In such case, a degree of freedom with respect to a value of a termination resister as well as a formation position of the termination resistor itself can be also expanded. With respect to the value of a termination resister, it is supposed that, for example, a required bandwidth is 50 GHz, and a bandwidth which is estimated from a CR product at 50 ohm termination can be set to 100 GHz which is a value including a margin and being twice an actually required value. In this case, when the resistance value of the terminator is set to 100 ohm which is twice the 50 ohm, the amplitude of an output voltage can be twice original amplitude thereof by making an amount of an output current of a transistor provided at an output stage of the driving circuit same as an original amount thereof. Moreover, it also becomes possible to suppress an amount of a driving current to one second of an original amount while maintaining current amplitude of the output voltage. As a result, it becomes possible to achieve enhancement of reliability by lowering an operation current density without changing the size of a transistor provided at an output stage, or speedup of operation resulting from a reduction of an element capacitance caused by downsizing the transistor provided at the output stage. In this way, it becomes possible to apply a margin of an operation speed to the output voltage or the output current. Moreover, since a joule loss (that is, generated heat) at a terminator is proportional to a product of the second power of an amount of a driving current and a resistance of the terminator, an amount of the generated heat can be suppressed to one second of an original amount thereof. This is preferable for an element constituting the driving circuit from a viewpoint of reliability. Incidentally, it becomes possible to configure so as to form a terminator directly on a driving IC or an optical modulator (a so-called on-chip termination) although such a formation has been advantageous from an aspect of high-frequency characteristics but has been difficult out of concern for temperature characteristics. For this reason, the configuration of the multi-level optical modulator module 100 can be considered to be advantageous from a viewpoint of an improvement of high-frequency characteristics.

Meanwhile, the terminator is configured so as to be handled substantially like a concentrated-parameter circuit element, and thus, although the terminator is disposed at any one of a position on the discrete driving circuit, a position on the optical modulator, and a midpoint therebetween, it is possible to suppress an influence of the position of the terminator on frequency response characteristics to a degree that does not cause any problem from a viewpoint of a practical use. As a result, it becomes possible to enhance the degree of freedom with respect to a module mounting configuration from a viewpoint of a circuit configuration.

Incidentally, a specification as to whether or not an optical phase modulation is to be performed in, for example, an i-th one of the modulator regions 14 when counted from the input side is made by a digital input signal $D_i$ inputted to an i-th one of the discrete driving circuits 21, connected to the i-th one of the modulator regions 14. Further, it is supposed that each of the modulator regions 14 has the same length, and an amount of a phase shift applied to a modulation target light signal in each of the modulator regions 14 is the same. In this case, the total amount of phase shifts applied to the modulation target light signal is proportional to the total number of the modulator regions 14 for which an execution of optical phase modulation is specified by the digital input signal $D_i$.

Moreover, it is possible to discretely specify the total amount of phase shifts applied to a modulation target optical signal by using (n−1) digital input signals by allowing a k-th digital input signal $D_k$ to drive $2^{(k-1)}$ ones of the discrete driving circuits 21 as a group in the same logic. This enables realization of a function equivalent to a function resulting from replacing an analog electric signal outputs by one of phases of light in a digital-to-analog converter.

In such a configuration as that of the multi-level optical modulator module 100 in which the above-mentioned optical phase modulator 13 is formed on each of a pair of delay paths included in an MZ interferometer, $2^{2n}$ combinations of complex amplitudes of the modulation target light signal can be specified. Through the use of such a property, the multi-level optical modulator module 100 enables realization of multi-level optical modulation using digital signals without directly applying any analog electric signal. In addition, it is possible to perform an offset adjustment of a phase-shift amount by, for example, separately applying a voltage signal to one of the modulator regions 14 which is unnecessary to be modulated, such as a first one of the modulator regions 14, shown in FIG. 1, when counted from the input side.

In addition, in the case where each of segmented electrodes (modulator regions) can be regarded as a concentrated-parameter circuit element (an element of an optical modulator of concentrated-parameter type), generally, a measure of modulation bandwidth thereof is given by a product of capacitance and termination resistance (i.e., a CR product) of the each modulator region. According to the configuration of the multi-level optical modulator module 100, this capacitance decreases substantially in proportion to a segmentation number. Accordingly, it is possible to relatively easily realize modulation bandwidth beyond 100 GHz for each of the segmented optical modulator regions and this is advantageous from a viewpoint of high-speed operation.

Moreover, with respect to the multi-level optical modulator module 100, as described above, it is possible to realize reduction of the driving voltage amplitude. Accordingly, it becomes possible to produce a driving circuit by employing a process technology for kinds of semiconductors, each being for use in low-voltage amplitude driving but being superior in mass productivity, high uniformity and a high degree of integration, such as a CMOS-IC (complementary metal oxide semiconductor-integrated circuit) or a SiGe-HBT (heterojunction bipolar transistor)-IC. On the other hand, a driving circuit based on a III-V compound semiconductor, such as GaAs or InP, is high-speed operable but a driving voltage therefor is high, and it has problems in mass productivity and a degree of integration. As compared with a case using such a driving circuit, the multi-level optical modulator module 100 is more advantageous from a viewpoint of downsizing, a cost reduction and a reduction of power consumption. Further, with respect to the multi-level optical modulator module 100, there is a possibility that a reduction of the number of parts by integrating light-source components leads to a further cost reduction.

In addition, when the driving voltage is decreased, the configuration of the first exemplary embodiment enables the modulator regions to operate in an area where an amount of a nonlinear (complex) refractive-index variation to the intensity of an applied electric field due to phenomena, such as a Franz-Keldysh effect and a quantum confinement Stark effect which are fundamental modulation principles for semiconductor optical modulators, is relatively small (that is, more linear). Through this configuration, even when compound semiconductor based semiconductor optical modulator components which are deemed to be disadvantageous from a viewpoint of optical fiber transmission characteristics because wavelength chirping thereof is larger as compared with that of components of an LN based optical modulator are used, characteristics not inferior to those of the LN based optical modulator can be realized.

That is, the first exemplary embodiment is configured such that the optical phase modulator is segmented into a plurality of modulator regions, and is provided with a means for individually driving these modulator regions. This configuration makes it possible to substantially suppress the occurrence of a phenomenon in which, in a general traveling-wave electrode structure, a modulation electric signal transmitting through the electrode is attenuated. Thus, according to the configuration of the first exemplary embodiment, it is possible to solve a problem which is saturation of an optical modulation efficiency at the time of modulation of high-speed light, the problem being inherently involved in traveling-wave type optical modulators.

Moreover, according to the configuration of the first exemplary embodiment, the segmentation of the optical phase modulator into the n modulator regions allows parasitic capacitance of each of the modulator regions to decrease to approximately 1/n. Through this configuration, modulation bandwidth per modulator region expands to a great degree. Thus, the configuration of the first exemplary embodiment is advantageous in high-speed optical modulation. Further, the configuration of the first exemplary embodiment is a structure in which the loss of a modulation electric signal in each of the segmented modulator regions is effectively negligible. Thus, as described above, the configuration of the first exemplary embodiment can make a total length of modulator regions contributing to optical (phase) modulation longer. Accordingly, since a driving voltage necessary to obtain a phase-shift amount per stage which is assumed by each of the modulation regions can be reduced in inverse proportion to the total length of the plurality of modulator regions, the configuration of the first exemplary embodiment is advantageous in low voltage driving.

Incidentally, a phase modulator incorporating in an optical phase modulator which is similar to the multi-level optical modulator module 100 and which includes a segmented electrode structure enables realization of a function of providing signal light passing through the optical phase modulator with a certain discrete phase shift by means of digital control. However, such a phase modulator cannot perform control of the absolute value of amplitude of the signal light independently. In this case, through enhancing the configuration of the phase modulator into a configuration of an MZ multi-level optical modulator based on a segmented electrode structure by incorporating the optical phase modulator provided with a segmented electrode structure into each of a pair of delay paths of the MZ interferometer, it becomes possible to generate any appropriate complex optical amplitude within a circle with a radius of 1. Additionally, through using the configuration of the first exemplary embodiment, it is possible to configure an I-Q optical modulator (I: In-Phase, Q: Quadrature-Phase) in which I-Q orthogonal modulation processing, which is widely used in wireless communications and the like, is performed on light. Such an I-Q optical modulator can be realized by preparing a set of the two MZ multi-level optical modulator based on a segmented electrode structure, branching a modulation target optical signal outputted from the same light source into two optical signals, optically modulating each of the two optical signals with a corresponding one of I-channel and Q-channel modulation electric signals and merging their respective resultant modulated signal lights with a mutual phase deference of $\pi/4$.

Figure 2:
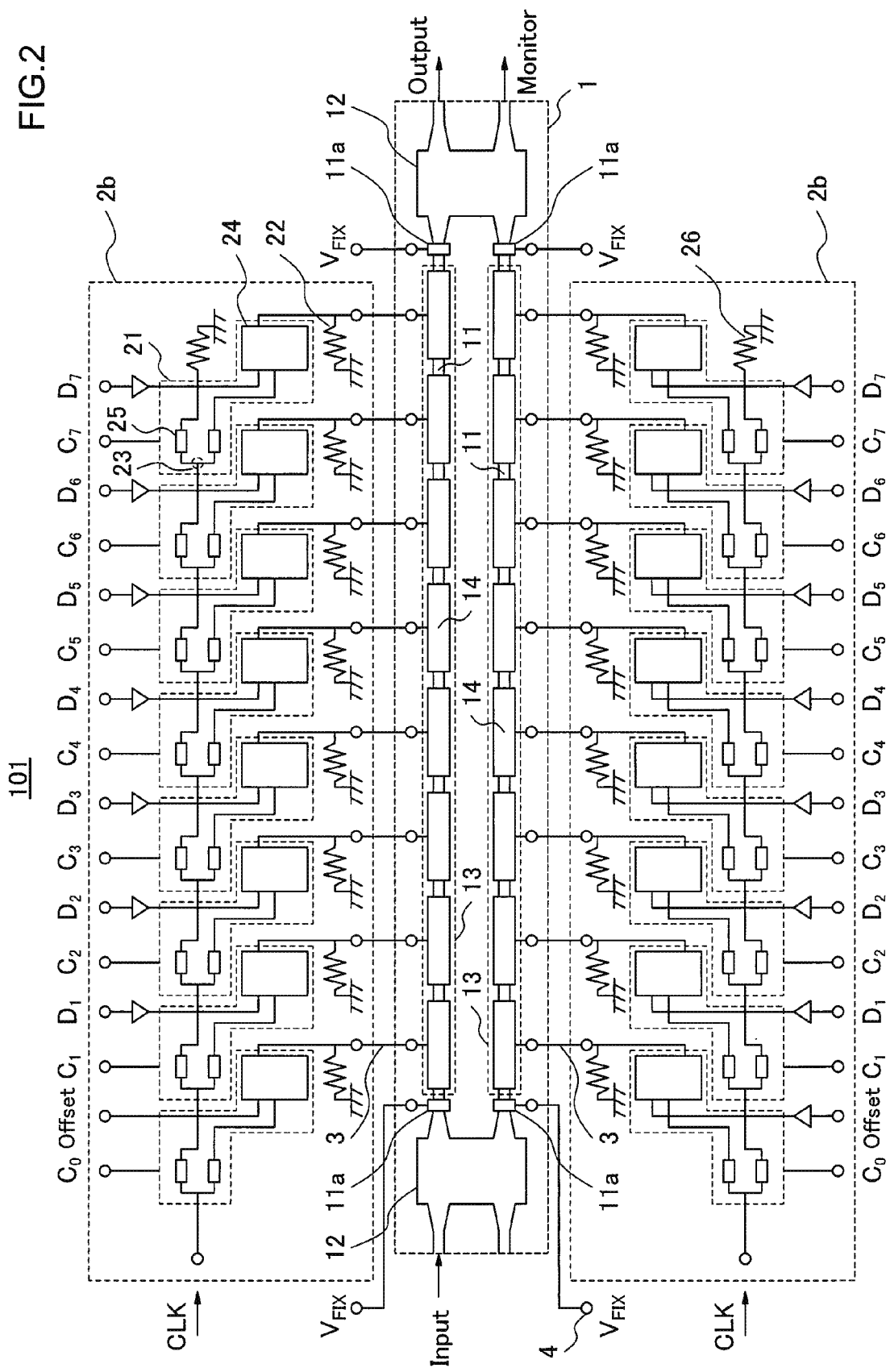
[FIG. 2] A diagram illustrating an example in which the configuration of a multi-level optical modulator module of a first exemplary embodiment is converted

Moreover, FIG. 2 is a diagram illustrating a configuration of a multi-level optical modulator module 101 which is an example of a conversion of the configuration of the multi-level optical modulator module 100. The multi-level optical modulator module 101 is a module resulting from replacing the integrated circuit 2a of the multi-level optical modulator module 100 by an integrated circuit 2b.

In the integrated circuit 2b, the discrete driving circuit 21 is also connected to a first one of the modulator regions 14 when counted from the input side. In this multi-level optical modulator module 101, it is possible to, just like in the multi-level optical modulator module 100, perform an offset adjustment process on a phase of a modulation target optical signal by appropriately operating a first one of the discrete driving circuits 21 when counted from the input side.

Here, the configuration of the optical modulator 1 included in the multi-level optical modulator module 101 is similar to that of the optical modulator 1 of the first exemplary embodiment. That is, an i-th one of the modulator regions 14 from the input side includes a modulation electrode having a length $L_i$. Further, a distance by which a modulation electric signal applied to the above modulator electrode penetrates in each of forward and backward directions extending from the modulator region 4 along the optical signal propagation axis is the length $\Delta L$. Further, a distance between modulation electrodes of any two adjacent ones of the modulator regions 14 is the length $2\Delta L$.

Accordingly, similarly, in the multi-level optical modulator module 101, regardless of whether or not the plurality of modulator regions 14 in driven states are adjacent to one another, linearity between the effective length and the total number of the plurality of modulator regions 14 in driven states is kept favorable. For this reason, in the multi-level optical modulator module 101, notwithstanding any change in the total number and/or the positions of the modulator regions 14 in driven states, it is possible to suppress unnecessary optical phase modulation between every two adjacent modulator regions. As a result, the multi-level optical modulator module 101 brings about an advantageous effect that it is possible to realize a broadband and low-driving-voltage optical modulator module which is capable of generating a multi-level/multiplexed optical modulation signal with less distortion.

In addition, the advantageous effect of the multi-level optical modulator module 100 having been described in FIG. 1 is also realized by the following optical modulator module provided with a minimum configuration. That is, the optical modulator module includes an optical modulator and discrete driving circuits. The optical modulator includes an optical waveguide for conducting an inputted optical signal and m modulator regions (m being an integer satisfying 2≤m) which are arranged so as to align on the optical waveguide and which modulates the optical signal. m discrete driving circuits included in the optical modulator module are connected in line. An i-th one of the discrete driving circuits (i being an integer satisfying 1≤i≤m) includes a driving circuit which outputs a signal resulting from amplifying a digital input signal while synchronizing the digital input signal with a synchronization signal to an i-th one of the modulator regions, and a phase shifting circuit which gives a delay to a signal branched from the synchronization signal and then outputs a resultant signal. Then, a signal outputted from a phase shifting circuit included in a (j−1)th one of the discrete driving circuits (j being an integer satisfying 2≤j≤m) is inputted to a j-th discrete driving circuit as a synchronization signal. Moreover, the modulator regions include a modulation electrode, and when an electric field penetrating in a transmission direction of an optical signal caused by a modulation electric signal applied to the modulation electrode has a penetration length denoted by d, a distance $L_{gap}$ between every two adjacent ones of the modulation electrodes is determined so as to satisfy $L_{gap}$=2d. The optical modulator module provided with such a minimum configuration is also configured such that the distance $L_{gap}$ between every two adjacent ones of the modulation electrodes becomes equal to 2d, and thus, brings about the same advantageous effect as those of the multi-level optical modulator module 100 having been described in FIG. 1. That is, the optical modulator module provided with the foregoing minimum configuration also brings about an advantageous effect that it is possible to realize a broadband and low-driving-voltage optical modulator module which is capable of generating a multi-level/multiplexed optical modulation signal with less distortion.

FIRST EXAMPLE

A first example is an operation verification example about the multi-level optical modulator module 100 according to the first exemplary embodiment.

In this example, the semiconductor optical waveguide 11 of the optical modulator 1 is formed on a Fe-doped InP semi-insulating substrate (not illustrated). A core layer and cladding layers which insert the core layer between the cladding layers from upper and lower directions are formed above the Fe-doped InP semi-insulating substrate. The core layer includes an undoped AlGaInAs multiple quantum well layer and undoped InGaAsP light confinement layers which are formed on the upper and lower faces of the undoped AlGaInAs multiple quantum well layer. This configuration is a so-called divided confinement heterostructure (neither of these layers being not illustrated). Here, the configuration of the undoped AlGaInAs multiple quantum well layers is such that: the number of well layers is 12; the thickness of the well layer is 10 nm; the thickness of a barrier layer is 8 nm; and the wavelength of a transition wave is 1400 nm. The undoped InGaAsP light confinement layer was formed such that its wavelength composition is 1300 nm and its thickness is 20 nm. In addition, the cladding layer includes p-type InP and n-type InP. The semiconductor optical waveguide 11 has a property that, when an electric field is applied to the undoped AlGaInAs multiple quantum well layer, a (complex) refractive-index variation which influences 1550 nm band optical signal propagating along the above well layer occurs through the quantum confinement Stark effect.

The optical multiplexer/demultiplexer unit 12 is an MMI (multi-mode interference) multiplexing and demultiplexing unit which has the same layered structure as that of the semiconductor optical waveguide 11 and which includes two inputs and two outputs.

The plurality of discrete driving circuits 21 is monolithic-integrated in a lump on the identical semiconductor substrate through a SiGe-HBT process and is capable of performing operation synchronized with a clock signal CLK whose clock frequency is beyond 50 Gb/s. The driving signal wiring 3 is formed of a strip line and its characteristic impedance is 50 ohm. The resistance value of the terminator 22 is 50 ohm.

For each of the modulator regions 14, a serial resistance was 5 ohm, an element capacitance was not larger than 0.07 pF and frequency response bandwidth in a stand-alone state was 55 GHz. Incidentally, a modulator region 14 unnecessary to be operated was used for an offset adjustment of a phase-shift amount by separately applying a voltage signal to an electrode included in the relevant modulator region 14. Through driving each of the modulator regions 14 with an electric signal having an amplitude of 0.7 Vpp, a phase variation of $\pi/16$ could be given to an inputted modulation target optical signal being in a transverse electric (TE) mode and having a wavelength of 1550 nm. Moreover, when an effective film thickness of an electrode included in a modulator region supplied with an electric field in accordance with a modulation electric signal applied to the modulation electrode is made t, $\Delta L$ is approximately equal to 0.8t, that is, $\Delta L \approx 0.8t$.

Moreover, a delay of the phase shift circuit 25 was adjusted such that a period of time necessary for a modulation target optical signal to pass through one stage of the modulator regions 14 coincides with a period of time necessary for a clock signal to pass through one stage of the discrete driving circuits 21. In such ways as described above, pseudo traveling-wave operation whose effective modulation frequency response bandwidth exceeds 50 GHz was realized. As a result, through this configuration, a practical 50 Gb/s—NRZ (non-return-to-zero) optical modulation characteristic having a favorable eye opening was realized.

(Second Exemplary Embodiment)

Figure 3:
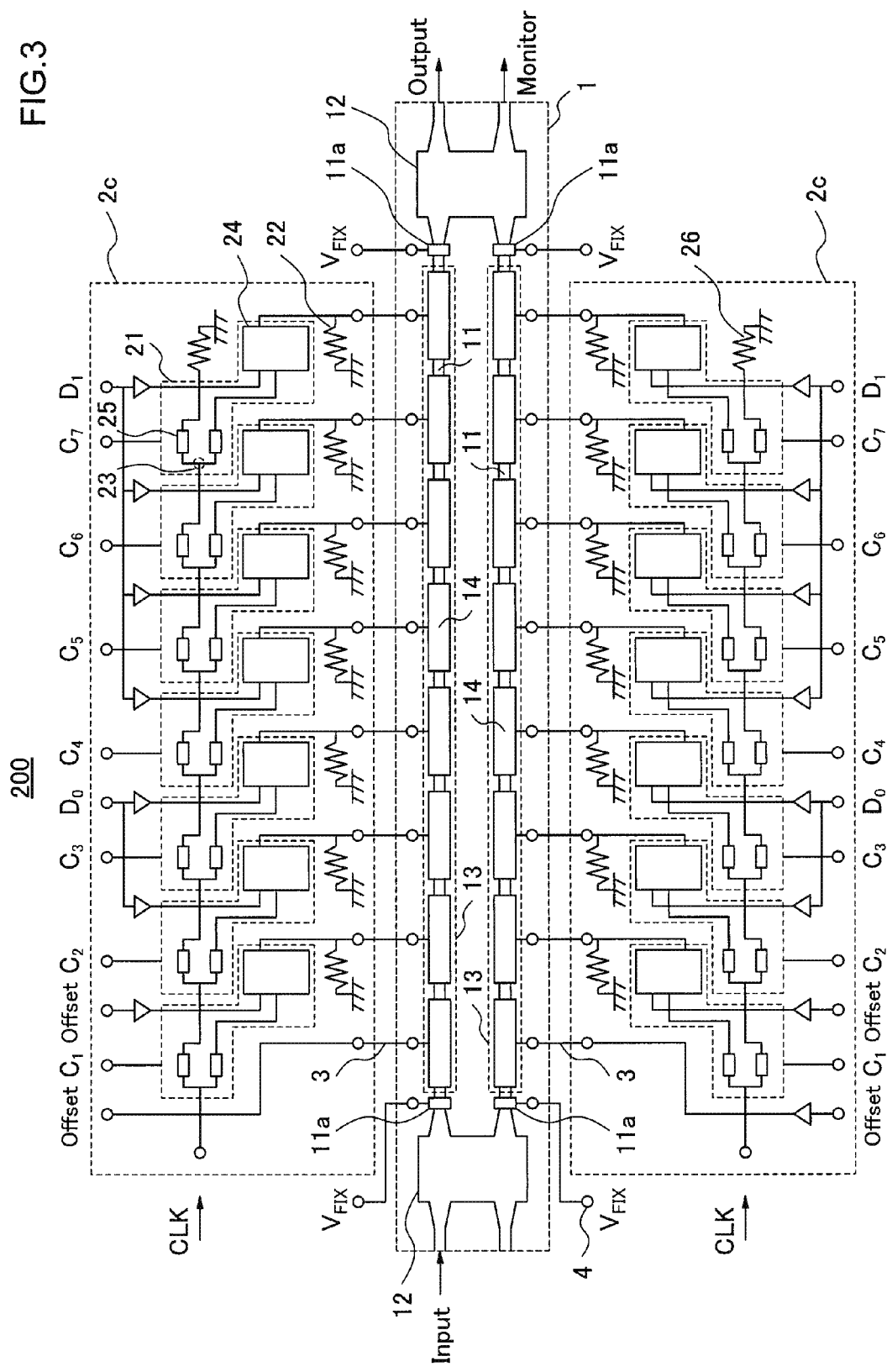
[FIG. 3] A diagram illustrating a configuration of a programmable multi-level optical modulator module of a second exemplary embodiment

Next, a programmable multi-level optical modulator module 200 according to a second exemplary embodiment will be described. FIG. 3 is diagram illustrating a configuration of the programmable multi-level optical modulator module 200 according to the second exemplary embodiment. As shown in FIG. 3, in the programmable multi-level optical modulator module 200, the integrated circuit 2a of the multi-level optical modulator module 100 is replaced by an integrated circuit 2c. As compared with the integrated circuit 2a, in the integration circuit 2c, the input interfaces for the digital input signal are changed so that modulator regions targeted for driving can be selected for each group of $2^{(m-1)}$ stages of the modulator regions.

A terminal D of a discrete driving circuit connected to the second stage of the modulator regions 14 is supplied with, for example, an offset signal Offset. Further, each of subsequent stages of the modulator regions 14 is supplied with a corresponding one of digital input signals $D_0$ to $D_1$.

It is preferable that amounts of phase shifts applied to a modulation target optical signal can be controlled in unit of $\pi/2^{(n-1)}$ in OFDM and QAM which have been described above, as well as optical PSK (phase shift keying) modulation or DPSK (differential phase shift keying), and optical QPSK (quadrature phase shift keying) modulation or DQPSK (differential quadrature phase shift keying). For this reason, segmented modulator regions 14 are grouped into a group of one stage of the segmented modulator regions, a group of two stages thereof, a group of four stages thereof, . . . a stage of $2^{(n-1)}$ stages thereof. Further, in order to be able to control the modulator regions 14 in a lump for each of the groups, a fan-out wiring having one input and $2^{(n-1)}$ outputs is provided at the front stage of the digital data input of the driving circuits. Other configurations are the same as those of the multi-level optical modulator module 100, and thus, description thereof is omitted here.

In the programmable multi-level optical modulator module 200, when paying attention to one digital segmented electrode optical phase modulator incorporated in each of a pair of delay paths of an MZ interferometer, as described above, operation definitely same as that of a case where, in an electronic circuit, analog electric outputs of a digital-to-analog converter are caused to correspond to phases of the signal light is realized.

Subsequently, operation of the programmable multi-level optical modulator module 200 will be described. The programmable multi-level optical modulator module 200 makes it possible to discretely specify the total amount of phase shifts applied to a modulation target optical signal by using k digital input signals by allowing a k-th digital input signal $D_k$ to drive $2^{(k-1)}$ discrete driving circuits 21 as a group in the same logic. Through driving the discrete driving circuits 21 as some groups, behavior same as that of a case where, in a digital-to-analog converter, analog electric output signals are replaced by phases of light is realized.

According to this structure, it is possible to realize a function of replacing a combination of driven groups by a corresponding binary number. Through this function, when using the programmable multi-level optical modulator module 200, it is possible to realize multi-level optical modulation in a digital manner by paying attention only to combinations of a phase-shift amount of $\pi/2^{(n-1)}$ without being conscious of the actual positions and the total number of modulator regions 14 targeted for driving.

In addition, in the programmable multi-level optical modulator module 200, just like the multi-level optical modulator module 100, it is possible to adjust an offset of a phase-shift amount by separately applying a voltage signal to electrodes included in modulator regions 14 which are unnecessary to be driven.

Here, the configuration of the optical modulator 1 included in the multi-level optical modulator module 200 is the same as that of the first exemplary embodiment. That is, an i-th modulator regions 14 from the input side includes a modulation electrode having a length $L_i$. Further, a distance by which a modulation electric signal penetrates in each of forward and backward directions extending from each of the modulator regions 14 along an optical signal propagation axis is a length $\Delta L$, and a distance between modulation electrodes of every two adjacent ones of the modulator regions 14 is length $2\Delta L$.

Accordingly, similarly, in the multi-level optical modulator module 200, regardless of whether or not a plurality of modulator regions 14 in driven states are adjacent to one another, linearity between the effective length and the total number of the plurality of modulator regions in driven states is kept favorable. For this reason, in the multi-level optical modulator module 200, notwithstanding any change in the total number and/or the positions of modulator regions in driven states, it is possible to suppress unnecessary optical phase modulation between every two adjacent modulator regions. As a result, the multi-level optical modulator module 200 brings about an advantageous effect that it is possible to realize a broadband and low-driving-voltage optical modulator module which is capable of generating a multi-level/multiplexed optical modulation signal with less distortion.

SECOND EXAMPLE

A second example is an operation verification example about the programmable multi-level optical modulator module 200 according to the second exemplary embodiment. The configurations of the optical modulator 1 and the discrete driving circuit 21 in this second example are the same as those of the first example described above.

In the configuration of the second example, an independent 25 Gb/s-NRZ digital electric signal was inputted to each of two data input terminals of the digital segmented electrode multi-level optical modulator while synchronized with an input clock signal having a clock frequency of 25 Gb/s. As a result, favorable 25 GBaud/s optical QPSK modulation (one Baud being equivalent to two bits) on optical signal light of a wavelength of 1550 nm, in which a phase error and an amplitude error were ideally suppressed, was realized.

(Third Exemplary Embodiment)

Figure 4:
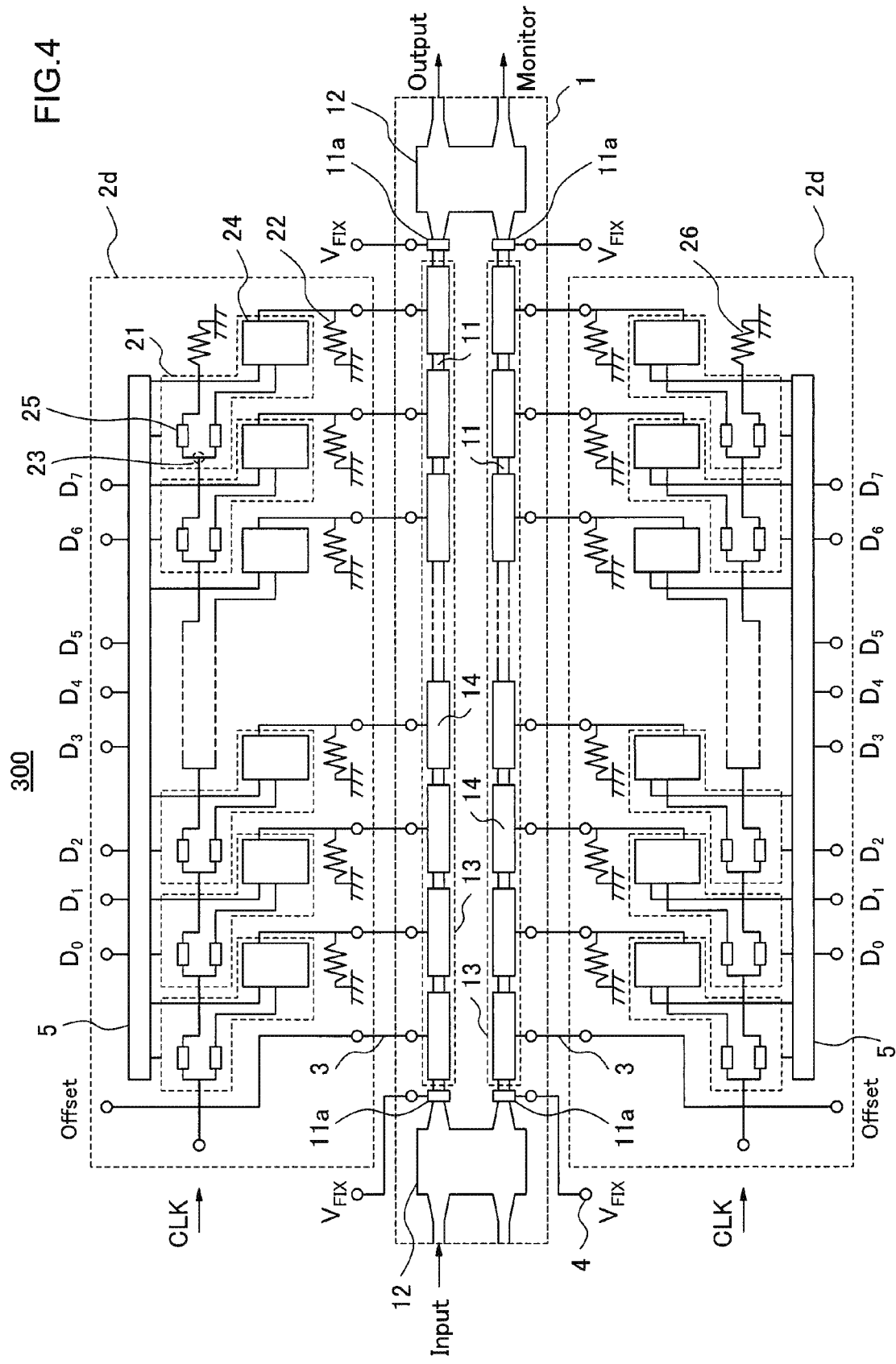
[FIG. 4] A diagram illustrating a configuration of a programmable multi-level optical modulator module of a third exemplary embodiment

Next, a programmable multi-level optical modulator module 300 according to a third exemplary embodiment will be described. FIG. 4 is diagram illustrating a configuration of the programmable multi-level optical modulator module 300 according to the third exemplary embodiment. As shown in FIG. 4, in the programmable multi-level optical modulator module 300, the integrated circuit 2a of the multi-level optical modulator module 100 is replaced by an integrated circuit 2d.

In the integrated circuit 2d, the optical phase modulator 13 is segmented into, for example, 256 modulator regions 14. The discrete driving circuits 21 are connected to an arithmetic circuit 5. For example, eight digital input signals $D_0$ to $D_7$ are inputted to the arithmetic circuit 5, and then, digital signals for driving the 256 modulator regions 14 included in the optical phase modulator 13 are generated on the basis of an arithmetic operation based on the eight digital input signals $D_0$ to $D_7$. Configurations other than these configurations are the same as those of the multi-level optical modulator module 100, and thus, description thereof is omitted here.

Subsequently, operation of the programmable multi-level optical modulator module 300 will be described. In the programmable multi-level optical modulator module 300, the arithmetic circuit 5 performs control of each of the modulator regions 14 on the basis of parameters programmed in advance and the inputted digital input signals. The parameters mentioned here includes, for example, degrees of dependence on intensity, wavelength and ambient temperature with respect to a modulation target optical signal, changes of these parameters caused by aging, degrees of dependence on a route and a distance with respect to transmission characteristics of an optical fiber (wavelength dispersion, polarization dispersion and the like). Moreover, the parameters may include variations in manufacturing processes with respect to optical modulation characteristics of the modulator region 14, receiver sensitivity at a light receiver side and the like. That is, these parameters are correction coefficients of physical quantities which affects the optical fiber transmission characteristics under the environments and conditions that the multi-level optical modulator module is actually used or coefficients which are specific to each of optical modulation methods and which are used in arithmetic algorithms for use in generation of various optical modulation codes. Further, it is possible to rewrite these parameters from the outside by using programs or the like.

The programmable multi-level optical modulator module 300 includes the arithmetic circuit 5 which performs digital processing. Thus, the programmable multi-level optical modulator module 300 is capable of performing processing while switching the foregoing control without using any analog circuit. The arithmetic circuit 5 is capable of performing compensations for, for example, a degree of dependence on light-signal intensity, a degree of dependence on wavelength, a degree of dependence on ambient temperature, variations of optical modulation characteristics with respect to elements, changes of these items caused by aging and the like, and control of changes in multi-level optical modulation coding. That is, the programmable multi-level optical modulator module 300 is capable of realizing the foregoing processing without making any change of hardware and performing any adjustment merely by rewriting the parameters to be inputted to the arithmetic circuit 5 in a software-based manner.

Accordingly, it becomes possible to automate most of inspection and adjustment tasks in production and shipment of an optical fiber communication system to which the programmable multi-level optical modulator module 300 is applied. Moreover, even defective products in characteristics, which are supposed to be out of standards for characteristics in manufacturing inspection processes, can be relieved as acceptable products satisfying predetermined specifications by extracting arithmetic parameters which compensate such characteristics in advance and providing the arithmetic parameters as firmware.

Moreover, the programmable multi-level optical modulator module 300 enables generation of driving signals each associated with a corresponding one of desired optical modulation codes in the arithmetic circuit 5. Thus, it is unnecessary to provide mutually different kinds of driving circuits (including logical arithmetic circuits) each associated with a corresponding one of optical modulation codes. Thus, one kind of driving circuit can be applied to various uses, and this leads to significant constriction of stocktaking cost, a mass production effect brought by narrowing down product classes, and the like, so that a significant cost reduction can be expected.

Moreover, the programmable multi-level optical modulator module 300 is capable of flexibly and efficiently dealing with any adjustment to an optimal operation state along with an operation configuration change at the time of practical use, and thus, a reduction of operation cost can be also expected. As the operation configuration change, there exist changes of a transmission route, wavelength and the like. Additionally, as the adjustment to an optimal operation state, there exist tasks, such as a complicated voltage amplitude adjustment task necessary to generate optimal optical modulation waveform.

That is, according to the configuration of the third exemplary embodiment, it is possible to realize a programmable multi-level optical modulator module for which a comprehensive cost reduction effect including manufacturing, inspection and operation can be expected, as well as optical fiber communication systems to which such a programmable multi-level optical modulator module is applied.

Incidentally, with respect to CMOS-IC and SiGe-HBT-IC which are superior in mass productivity and a degree of integration, because of restrictions on their respective operation speeds, it has been technically difficult to realize such a circuit that processes a digital input signal whose frequency is beyond 10 Gb/s by means of arithmetic operation. However, at present, developments of such a digital signal processor (hereinafter, referred to as a DSP) that deals with a high-speed digital signal of a class of 50 Gb/s are being promoted. Then, the present technology is in the level that can realize ICs each capable of processing arithmetic operation which is performed by the programmable multi-level optical modulator module 300 at a speed beyond 10 Gb/s. Accordingly, the programmable multi-level optical modulator module 300 is capable of carrying out the foregoing operation at a sufficiently high speed.

Here, the configuration of the optical modulator 1 included in the multi-level optical modulator module 300 is the same as that of the first exemplary embodiment except that the total number of the modulator regions 14 is different. That is, an i-th modulator region 14 from the input side includes a modulation electrode having a length $L_i$. Further, a distance by which a modulation electric signal penetrates in each of forward and backward directions extending from each of the modulator regions 14 along an optical signal propagation axis is a length $\Delta L$, and a distance between modulation electrodes of every two adjacent ones of the modulator regions 14 is a length $2\Delta L$.

Accordingly, similarly, in the multi-level optical modulator module 300, regardless of whether or not a plurality of modulator regions 14 in driven states are adjacent to one another, linearity between the effective length and the total number of the plurality of modulator regions in driven states is kept favorable. For this reason, in the multi-level optical modulator module 300, notwithstanding any change in the total number and/or the positions of modulator regions in driven states, it is possible to suppress unnecessary optical phase modulation between every two adjacent modulator regions. As a result, the multi-level optical modulator module 300 brings an advantageous effect that it is possible to realize a broadband and low-driving-voltage optical modulator module which is capable of generating a multi-level/multiplexed optical modulation signal with less distortion.

THIRD EXAMPLE

A third example is an operation verification example about the programmable multi-level optical modulator module 300 according to the third exemplary embodiment. In multi-level optical modulation, the programmable multi-level optical modulator module 300 according to this example has a function of generating complex optical amplitudes which are associated with multi-level optical modulation (symbols) on a one-to-one basis from a digital input signal. As multi-level optical modulation methods, there exist, for example, (differential) quadrature phase shift keying modulation ((D)QPSK), orthogonal frequency division multiplex method (OFDM) and quadrature amplitude modulation method (QAM) whose practical use in trunk-line optical fiber communication systems is being promoted.

The arithmetic circuit 5 includes eight digital signal inputs. A high-speed digital signal processor (DSP) was used for the arithmetic circuit 5. This high-speed DSP is a processor having been produced by means of a process for CMOS of a gate length of 45 nm, and is capable of processing 16-bit data based product-sum arithmetic operations fifty-billion times per second. Further, the arithmetic circuit 5 performs an amplitude adjustment process and a waveform shaping process, adding a certain constant delay on 256 digital output signals resulting from arithmetic operation, and sequentially outputs resultant digital output signals to a corresponding one of 256 terminals. The modulator regions 14 are directly driven by the 256 digital output signals (0.4 Vpp) having been generated by the arithmetic circuit 5. Configurations and functions other than these configurations and functions are the same as those of the first example, and thus, description thereof is omitted here.

Under this configuration, through rewriting operation parameters given to the arithmetic circuit 5 by using programs, 100 Gb/s-optical QPSK modulation, 100 Gb/s-optical DQPSK modulation, 100 Gb/s-optical OFDM modulation, 100 Gb/s-optical QAM modulation and the like could be freely performed without performing any replacement of a hardware component, any adjustment of an analog electronic circuit and the like.

Further, the operation parameters given to the arithmetic circuit 5 were derived by extracting a degree of dependence on light intensity, a degree of dependence on wavelength and a degree of dependence on operation temperature with respect to optical modulation characteristics of the optical phase modulator 13. As the result of dynamically rewriting the operation parameters in response to a variation of operational condition and a variation of operational environment on the basis of the derived operation parameters, a degree of dependence on light intensity and a degree of dependence on wavelength with respect to a modulation target optical signal could be suppressed to a practically ignorable degree within such a wide temperature range as a range between 25 degrees C. and 85 degrees C. Accordingly, it was also confirmed that the programmable multi-level optical modulator module 300 is effective in a reduction of power consumption through non-temperature adjustment operation.

FOURTH EXAMPLE

Figure 5:
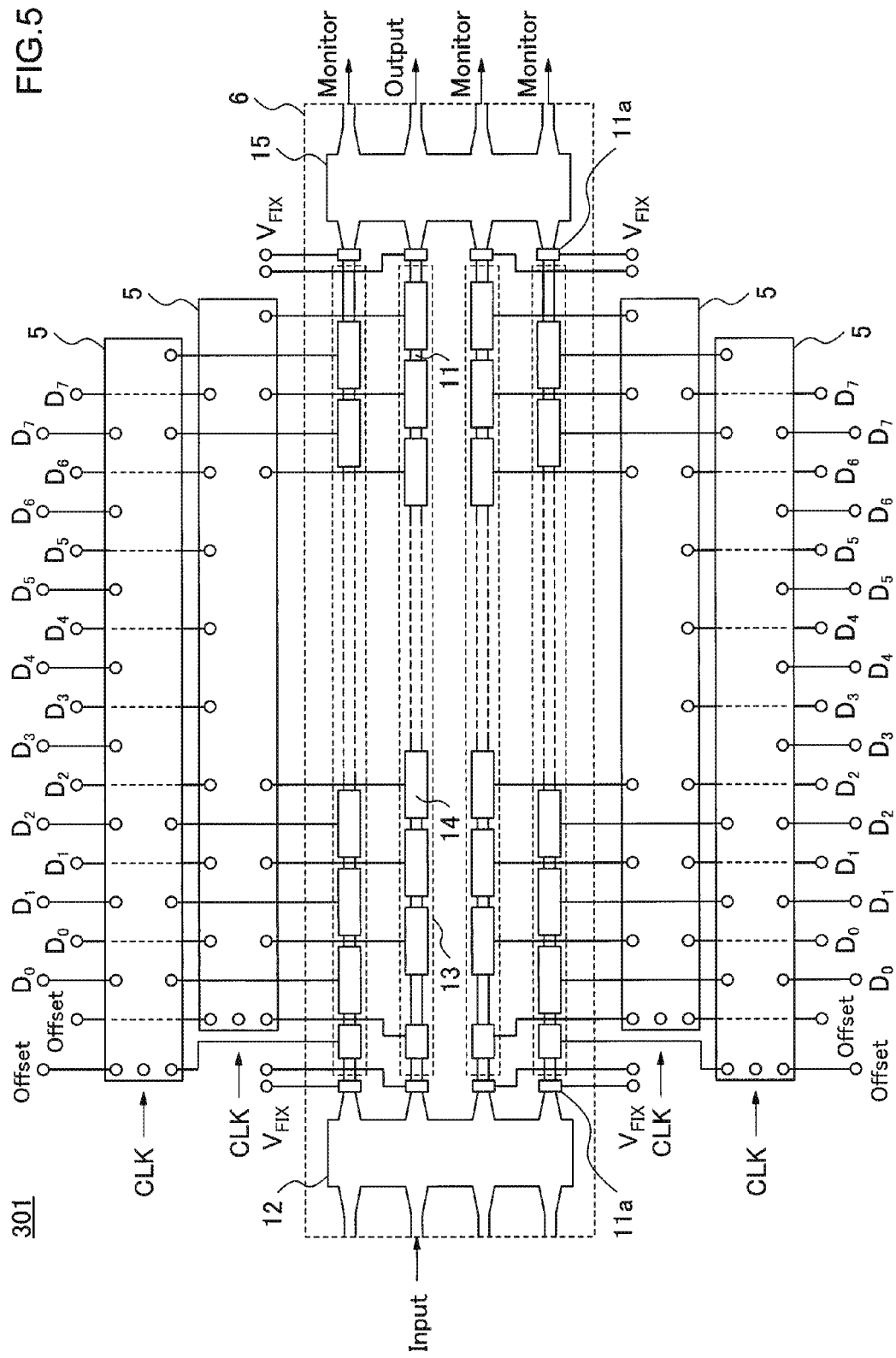
[FIG. 5] A diagram illustrating a configuration of a programmable multi-level optical modulator module of a fourth example

A fourth example is an example in which operation verification of the programmable multi-level optical modulator module according to the third exemplary embodiment was performed under the condition where a semiconductor quadrature multi-level optical modulator and CMOS-IC were employed. FIG. 5 is a diagram illustrating a configuration of a programmable multi-level optical modulator module 301 according to the fourth example. As shown in FIG. 5, in the programmable multi-level optical modulator module 301, the optical modulator 1 of the programmable multi-level optical modulator module 300 is replaced by an optical modulator 6. Further, the two integrated circuits were replaced by four arithmetic circuits 5. This arithmetic circuit 5 is common to the programmable multi-level optical modulator module 300 and the programmable multi-level optical modulator module 301.

The four optical phase modulators 13 were provided in the optical modulator 6. An optical multiplexer/demultiplexer unit 15 having four outputs and four inputs was provided at each of both ends of a set of the four optical phase modulators 13. The optical phase modulators 13 were segmented into the 256 modulator regions 14 just like in the example 3.

That is, the programmable multi-level optical modulator module 301 is capable of performing optical quadrature modulation (optical I/Q modulation) which becomes a baseline of multi-level optical modulation on a modulation target optical signal.

As the result of performing operation verification using this programmable multi-level optical modulator module 301, functions same as those of the programmable multi-level optical modulator module 300 according to the example 3 were realized.

Incidentally, in the programmable multi-level optical modulator module 301, unlike the programmable multi-level optical modulator module 300, the optical quadrature modulation (optical I/Q modulation) can be performed. This enables real parts and imaginary parts of complex amplitude of modulation signal light make correspond to one of digital input signals independently. For this reason, the programmable multi-level optical modulator module 301 is useful from a viewpoint in which knowledge about multi-level modulation technologies which have been amassed in wireless communications are applied to the multi-level optical modulation.

(Fourth Exemplary Embodiment)

Figure 6:
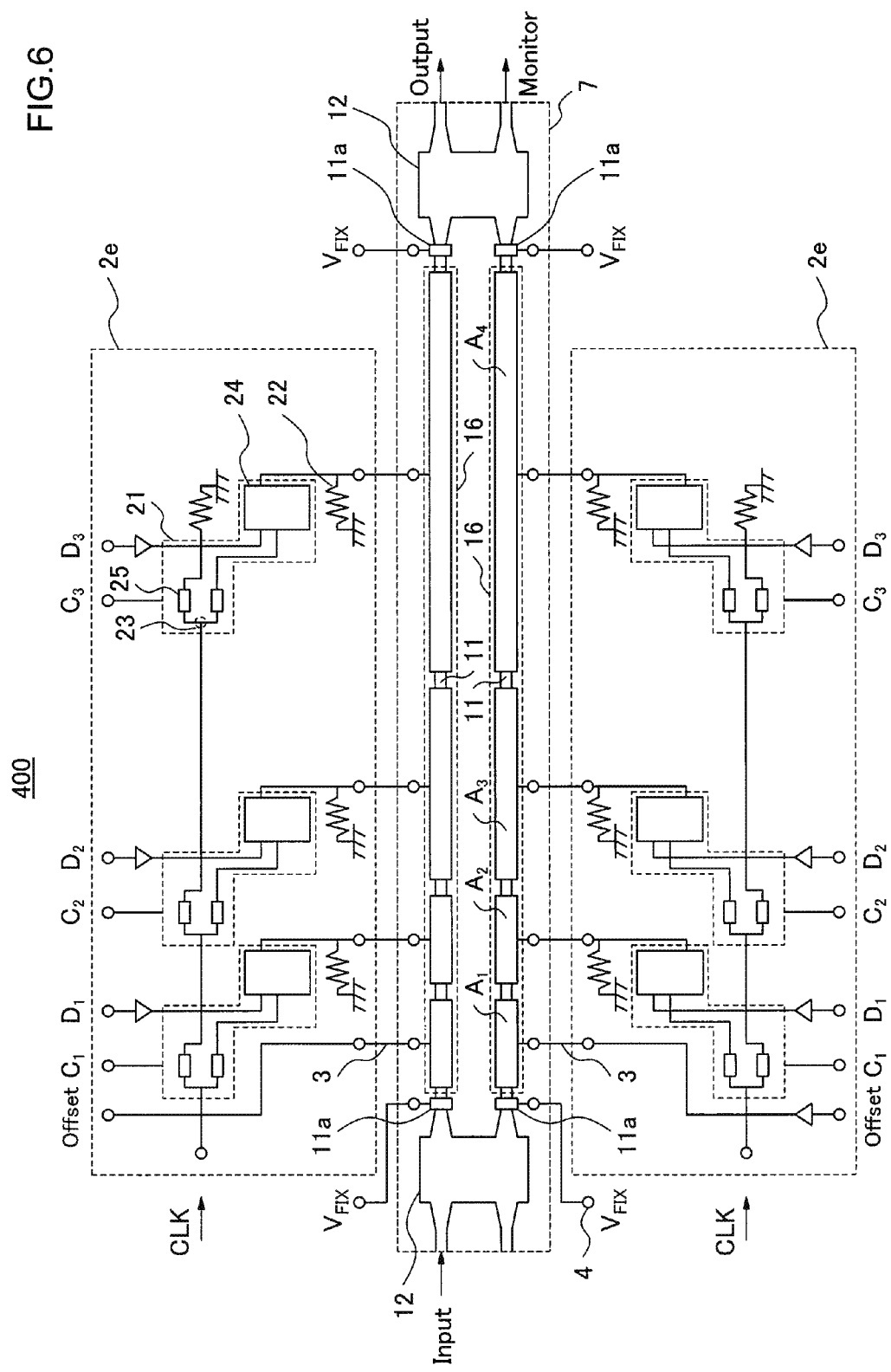
[FIG. 6] A diagram illustrating a configuration of a programmable multi-level optical modulator module of a fourth exemplary embodiment

Next, a multi-level optical modulator module 400 according to a fourth exemplary embodiment will be described. FIG. 6 is a diagram illustrating a configuration of the multi-level optical modulator module 400. As shown in FIG. 6, in the multi-level optical modulator module 400, the optical modulator 1 and the integrated circuit 2a of the multi-level optical modulator module 100 are replaced by an optical modulator 7 and an integrated circuit 2e, respectively.

The optical modulator 7 is provided with an MZ interferometer structure including the two single-mode semiconductor optical waveguides and the two optical multiplexer/demultiplexer units 12 including two inputs and two outputs. The optical phase modulator 16 is formed on each of the two semiconductor optical waveguides 11 which form a pair of delay paths in the MZ interferometer.

The optical phase modulators 16 are segmented into n modulator regions $A_1$ to $A_n$ such that individual minute intervals of the semiconductor optical waveguide 11 are demarcated. Here, with respect to lengths of the respective modulator regions $A_1$ to $A_n$ in a wave guiding direction, an i-th modulator region from the input side has a double length of an (i−1)th modulator region $A_{(i-1)}$ located immediately anterior to the modulator region $A_i$. That is, the modulator regions of the multi-level optical modulator module 400 being closer to the output side, the length of the modulator regions becomes longer by a power of 2. In addition, FIG. 6 indicates a configuration of the multi-level optical modulator module 400 in the case of n=4.

The integrated circuit 2e includes, for example, (n−1) discrete driving circuits 21 and (n−1) terminators 22 whose total number is (n−1). In FIG. 1, since n=4, three driving circuits 21 and three terminators 22 are provided. Configurations other than these configurations are the same as those of the multi-level optical modulator module 100, and thus, description thereof is omitted here.

Subsequently, operation of the multi-level optical modulator module 400 will be described. In the multi-level optical modulator module 400, the modulator regions 400 have lengths extending in the wave guiding direction and resulting from multiplying a power of 2. In the programmable multi-level optical modulator module 200 shown in FIG. 3, through providing fan-out wirings at the data input stages, the discrete driving circuits whose total number a power of 2 and the modulator regions whose total number is a power of 2 are driven by the same data. The multi-level optical modulator module 400 which is configured as shown in FIG. 6 can operate just like the programmable multi-level optical modulator module 200.

In this way, the multi-level optical modulator module 400 can keep the total amount of phase shifts which are applied to a modulation target optical signal to the same as that of the programmable multi-level optical modulator module 200, and simultaneously therewith, can reduce the total installation number of the discrete driving circuits 21 and the total installation number of driving signal wirings from 2m to m.

In this configuration, the optical modulation bandwidth of each of the modulator regions is considered to be dependent on each of the length thereof. Thus, it is anticipated that, while a modulation target optical signal transmits the modulator regions, dependence on the length of the each modulator region also appears in a frequency characteristic of a phase shift which is applied to this modulation target optical signal. In such a case, there also occurs a case where, in order to compensate this dependence on a length, a device on a circuit which enables realization of an optimal adjustment of the frequency characteristic for each of the discrete driving circuits is needed. Further, an upper limit of the length of the modulator region is also restricted by a modulation speed of a modulation electric signal.

For these reasons, the configuration of the fourth exemplary embodiment is effective when the number of states of the total amount of phase shifts to be applied to a modulation target optical signal is small (for example, a case where the states being associated with only four values: 0 degree, 90 degrees, 180 degrees and 270 degrees, or the like). Further, the configuration of the fourth exemplary embodiment is also effective in the case where a cost reduction through downsizing of the chip size of the integrated circuit is desired and this downsizing is realized by reducing the area of electrode pads which has become un-ignorable as compared with the area of discrete driving circuits under the situation where miniaturization has been advanced, through decreasing of the number of the electrode pads. Moreover, the configuration of the fourth exemplary embodiment is effective in the case where it is desired to generate a multi-level optical modulation signal based on optical OFDM or optical QAM, for which multiplicity (band utilization efficiency) per symbol is high, and thus, optical modulation rate itself is relatively easily restricted.

According to the configuration of the fourth exemplary embodiment, it becomes possible to give, for the modulator regions, phase shifts whose amounts are multiplied by a power of 2 merely by applying digital driving signals having a constant amplitude to of the modulator regions without applying a driving signal which is an analog quantity, that is, a voltage signal having a fluctuating amplitude. The complex amplitude of signal light complies with the principle of superposition. Thus, phase-shift amounts necessary for multi-level optical modulation can be easily obtained merely by causing a modulation target optical signal to pass through an optical waveguide on which the modulator regions are formed, and obtaining a sum of phase-shift amounts each associated with a corresponding one of modulator regions through which the modulation target optical signal has passed. In this case, if a means for selecting appropriately one of the modulator regions to supply one of the digital driving signals is provided, it becomes possible to realize a behavior same as that when the total amount of phase shifts which becomes necessary is externally programmed.

Thus, a circuit obtained by integrating a plurality of identical driving circuits each outputting only a digital electric signal instead of outputting an analog electric signal, as well as a circuit for programming a selection as to whether or not the digital electric signal is to be outputted from the driving circuit, has a significantly high affinity with ICs to which the CMOS process or the SiGe-HBT process, which have been described above, is applied. Moreover, a circuit for controlling a timing point, at which these driving signal outputs a corresponding one of the digital electric signals, in accordance with a constant synchronization signal has a significantly high affinity with these ICs. Thus, in the configuration of the fourth exemplary embodiment, with respect to the driving circuit itself of the optical modulator, downsizing, a reduction of power consumption, a cost reduction, and further, implementation of multi-functions are expected.

Through utilization of these features, it becomes possible to apply dynamic and static arithmetic operation to, for example, a correction of a temperature characteristic specific to the optical modulator module, an adjustment of waveform of modulation light, a correction of a degree of dependence on a wavelength with respect to optical modulation characteristics, an addition of error correction codes, and corrections of variations in manufacturing processes with respect to optical modulator elements themselves. Consequently, it becomes possible to easily realize, through a mere program change, tasks targeted for a yield-ratio improvement on elements, automation of adjustment tasks targeted for optimal driving conditions and characteristic adjustments under practical use, upgrading of functions and the like. Accordingly, the configuration of the fourth exemplary embodiment is also advantageous from a viewpoint of a cost reduction and scalability.

Here, in the optical modulator 7 included in the multi-level optical modulator module 400, a distance by which an applied modulation electric signal penetrates in each of forward and backward directions extending from the modulator regions $A_2$ to $A_4$ along an optical signal propagation axis is a length $\Delta L$, and a distance between modulation electrodes of every two adjacent ones of the modulator regions is length $2\Delta L$.

Accordingly, similarly, in the multi-level optical modulator module 400, regardless of whether or not a plurality of modulator regions 14 in driven states are adjacent to one another, linearity between the effective length and the total number of the plurality of modulator regions in driven states are kept favorable. For this reason, in the multi-level optical modulator module 400, notwithstanding any change in the total number and/or the positions of the modulator regions 14 in driven states, it is possible to suppress unnecessary optical phase modulation between every two adjacent modulator regions. As a result, the multi-level optical modulator module 400 brings about an advantageous effect that it is possible to realize a broadband and low-driving-voltage optical modulator module which is capable of generating a multi-level/multiplexed optical modulation signal with less distortion.

FIFTH EXAMPLE

A fifth example is an example in which operation verification of the multi-level optical modulator module 400 according to the fourth exemplary embodiment was performed under the condition where a semiconductor multi-level optical modulator and CMOS-IC were employed. In this fifth example, in the multi-level optical modulator module 400 shown in FIG. 6, the lengths of the optical phase modulator regions of the semiconductor multi-level optical modulator were made, from the input side, 100 μm, 200 μm and 400 μm constituting a combination of lengths, each resulting from multiplying a unit length of 100 μm by a power of 2. In this way, compared with the optical phase modulator 13 of the first and second examples, the total number of the discrete driving circuits 21 provided for one optical phase modulators 16 could be reduced to three from seven. Thus, similarly, the total number of the driving signal wirings 3 and the total number of the terminators 22 could be also reduced to three from seven. Thus, the fan-out wiring, as shown in the second example, which is provided at the front stage of each of the data inputs of the discrete driving circuits could be removed. Further, with respect to the layered structure, the transition wavelength was made 1430 nm by changing the wavelength composition of the multiple quantum well structure. Through these devices, the chip size of the integrated circuit 2e could be reduced to one second of that of the integrated circuit 2c of the second example.

In this fifth example, the wavelength composition of the multiple quantum well layer was set to 1430 nm and the wavelength composition is shorter than 1550 nm having been set in the second example. As a result, a proportion of a refractive-index variation which influences signal light of a wavelength of 1550 nm in accordance with an application voltage was made twice that of the second example. Thus, the same modulation characteristics as the modulation characteristics which can be realized in the multi-level optical modulator module 200 according to the second example could be realized.

(Other Exemplary Embodiments)

Hereinbefore, the present invention has been described with reference to the exemplary embodiments, however, the present invention is not limited to the aforementioned exemplary embodiments. Various changes understandable by those skilled in the art can be made on the configuration and details of the present invention within the scope of the present invention.

For example, the number of the modulator regions is not limited to the aforementioned exemplary embodiments and examples, and can be made any appropriate number.

Moreover, the driving signal wiring 3 may be directly formed on the IC by using a gold (Au) bump in addition to a strip line. Each circuit block of the discrete driving circuits and the arithmetic circuits and the like may be monolithic-integrated on the same semiconductor substrate.

In each of the exemplary embodiments, since a voltage amplitude for driving the modulator region can be suppressed to a small one by increasing the segmentation number, reflection-free terminators may be formed on the same semiconductor substrate together with the discrete driving circuits. Moreover, the configuration of each of the exemplary embodiments is not limited to the compound semiconductors, but may be also realized on the basis of a silicon (Si) optical waveguide. Furthermore, in this case, the driving circuits and the optical modulators may be monolithic-integrated on the same semiconductor substrate. Similarly, the configuration of each of the exemplary embodiments is also applicable to a multi-level optical modulator produced on the basis of an electro-optic crystal, an organic compound and the like, the electro-optic crystal being represented by the foregoing LN and having a Pockels effect or a higher-order electro-optic effect. Further, in this case, there is an advantage in the case where a refractive-index variation in accordance with an amplitude of an applied voltage is much larger than that of the aforementioned semiconductors.

Incidentally, in the programmable multi-level optical modulator module 300 shown in FIG. 4, there is illustrated a configuration in which terminals to which the offset signal Offset is inputted are pulled out to the outside. However, the configuration may be made such that an optimal voltage may be applied as an offset signal from the arithmetic circuit 5 via a D/A converter.

Moreover, the pair of optical multiplexer/demultiplexer units 15 in the programmable multi-level optical modulator module 301 of the fourth example may be replaced by an optical multiplexer/demultiplexer unit having five inputs and five outputs, for which an effect of suppressing internal residual reflection is further expected. However, in this case, two terminals, one being a central one of five input terminals, the other one being a central one of five output terminals, are needed to be reflection-free terminated.

In the fourth exemplary embodiment, although the length of the modulator regions increases by a power of 2 from the input side in order, the modulator regions may be arranged in any appropriate order, provided that the lengths of the modulator regions are different from one another and the length of a modulator regions has a length resulting from multiplying the certain unit length by a power of 2.

This application is based upon and claims the benefit of priority from Japanese Patent Application No. 2011-208260, filed on Sep. 23, 2011, the disclosure of which is incorporated herein in its entirety by reference.

Further, the aforementioned exemplary embodiments may be summarized in the following supplementary notes, although not limited thereto.

(Supplementary Note 1)

An optical modulator module including:

an optical modulator including an optical waveguide which conducts an inputted optical signal, and m modulator regions (m being an integer satisfying $2 \leq m$) which are arranged so as to align on the optical waveguide and which modulate the optical signal; and m discrete driving circuits that are connected in line, wherein an i-th one of the m discrete driving circuits (i being an integer satisfying $1 \leq i \leq m$) includes:

a driving circuit which outputs a signal obtained by amplifying a signal resulting from synchronizing a digital input signal with a synchronization signal to an i-th one of the modulator regions; and a phase shifting circuit which outputs a signal resulting from giving a delay to a signal branched from the synchronization signal, a j-th one of the discrete driving circuits (j being an integer satisfying 2≤j≤m) receives, as the synchronization signal, the signal outputted from the phase shifting circuit included in a (j−1)th one of the discrete driving circuits, and the modulator regions includes a plurality of modulation electrodes, supposing that a penetration length denoted by d is the penetration length of an electric field caused by a modulation electric signal applied to each of the modulation electrodes in a transmission direction of the optical signal, the distance between every two adjacent ones of the modulation electrodes $L_{gap}$ is given by $L_{gap}=2d$.

(Supplementary Note 2)

The optical modulator module according to supplementary note 1, wherein the m discrete driving circuits are monolithic-integrated on a same semiconductor substrate.

(Supplementary Note 3)

The optical modulator module according to supplementary note 1 or supplementary note 2, wherein, supposing that, when a modulation electric signal is applied to a modulation electrode of an i-th one of the modulator regions, an effective film thickness of the modulation electrode of the i-th one of the modulator regions, to which an electric field in accordance with the modulation electric signal is applied, is denoted by $t_i$, the penetration length d of the electric field is approximately equal to $0.8t_i$.

(Supplementary Note 4)

The optical modulator module according to any one of supplementary notes 1 to 3, wherein the phase shifting circuit further performs amplitude adjustment processing and waveform shaping processing on the signal branched from the synchronization signal.

(Supplementary Note 5)

The optical modulator module according to any one of supplementary notes 1 to 4 further including: m driving signal wirings each connecting between a corresponding one of the m modulator regions and a corresponding one of the m discrete driving circuits; and m first terminators each being connected between a ground electric potential and a corresponding one of the m driving signal wirings.

(Supplementary Note 6)

The optical modulator module according to supplementary note 5, wherein the m discrete driving circuits and the m first terminators are monolithic-integrated on a same semiconductor substrate.

(Supplementary Note 7)

The optical modulator module according to supplementary note 5 or supplementary note 6, wherein the optical modulator and the m first terminators are monolithic-integrated on a same semiconductor substrate.

(Supplementary Note 8)

The optical modulator module according to any one of supplementary notes 1 to 7 further including a second terminator connected between an output of the phase shifting circuit of an m-th one of the discrete driving circuits and a ground electric potential.

(Supplementary Note 9)

The optical modulator module according to any one of supplementary notes 1 to 8, wherein the modulator regions have the same length.

(Supplementary Note 10)

The optical modulator module according to any one of supplementary notes 1 to 9, wherein a plurality of the digital input signal whose number is 2k (k being an integer satisfying 1≤k≤m) are generated by replicating one digital signal, the 2k digital input signals are amplified, and each of the amplified signals is inputted to a corresponding one of 2k ones of the modulator regions.

(Supplementary Note 11)

The optical modulator module according to any one of supplementary notes 1 to 10, wherein the modulator regions have their respective lengths which are mutually different, and further, each of the lengths is equal to a length resulting from multiplying a unit length by a power of 2.

(Supplementary Note 12)

The optical modulator module according to any one of supplementary notes 1 to 11, wherein an i-th one of the modulator regions has a length equal to a length resulting from multiplying a unit length by $2^i$.

(Supplementary Note 13)

The optical modulator module according to any one of supplementary notes 1 to 12, wherein each of the discrete driving circuits applies a driving voltage having approximately the same amplitude to a corresponding one of the modulator regions.

(Supplementary Note 14)

The optical modulator module according to any one of supplementary notes 1 to 13, wherein the phase shifting circuit gives a delay which is controlled by an externally inputted electric signal to the signal branched from the synchronization signal.

(Supplementary Note 15)

The optical modulator module according to any one of supplementary notes 1 to 14, wherein a delay given by the phase shifting circuit included in an i-th one of the discrete driving circuits is approximately equal to a time lag of signal light which passes through a distance between the midpoint of an (i−1)th one of the modulator regions and a midpoint of an i-th one of the modulator regions.

(Supplementary Note 16)

The optical modulator module according to any one of supplementary notes 1 to 15, wherein the modulator regions are ones to which Franz-Keldysh effect with respect to a semiconductor, quantum confinement Stark effect with respect to a semiconductor or Pockels effect with respect to an electro-optic crystal is applied.

(Supplementary Note 17)

The optical modulator module according to any one of supplementary notes 1 to 16, wherein the modulator regions are provided on a plurality of the optical waveguides the number of which is g (g being an integer larger than or equal to 2) and which optically connect between an optical demultiplexer having f inputs and g outputs (f being an integer larger than or equal to 2) and an optical multiplexer having g inputs and f outputs.

(Supplementary Note 18)

The optical modulator module according to supplementary note 17 further including an electric potential fixing means that is connected to a jointing portion for optically jointing the optical demultiplexer having f inputs and g outputs and the optical demultiplexer having f inputs and g outputs, and the modulator regions located adjacent to the optical demultiplexer having f inputs and g outputs and the optical multiplexer having g inputs and f outputs.

(Supplementary Note 19)

The optical modulator module according to any one of supplementary notes 1 to 17 further including an arithmetic circuit for generating m time-series digital input signals from p time-series digital input signals (p being an integer satisfying 2≤p) in accordance with a preset arithmetic parameter, wherein each of the n discrete driving circuits receives any one of the m time-series digital input signals.

(Supplementary Note 20)

The optical modulator module according to any one of supplementary notes 1 to 19 being configured to include a function of externally rewriting the arithmetic parameter.

(Supplementary Note 21)

A modulation method for an optical signal, including:

causing an i-th one of m discrete driving circuits (i and m being integers satisfying 1≤i≤m, and 2≤m) which are connected in line to generate a signal obtained through amplification of a signal resulting from synchronizing a digital input signal with a synchronization signal;

causing a driving circuit to output the signal obtained through amplification to an i-th one of modulator regions which are formed on an optical waveguide of an optical modulator, wherein each of the modulator regions includes a corresponding one of at least m modulation electrodes, an electric field caused by a modulation electric signal applied to each of the modulation electrodes penetrates in a transmission direction of the optical signal by a penetration length, and supposing that the penetration length is denoted by d, a distance $L_{gap}$ between every two adjacent ones of the modulation electrodes is given by $L_{gap}=2d$;

causing a phase shifting circuit to output a signal resulting from giving at least a delay to a signal branched from the synchronization signal; and inputting a signal outputted from the phase shifting circuit of a (j−1)th one of the m discrete driving circuits (j being an integer satisfying 2≤j≤m) to an j-th one of the m discrete driving circuits.

Reference Signs List 1, 6 and 7: Optical modulator
2a to 2e: Integrated circuit
3: Driving signal wiring
4: Electric potential fixing means
5: Arithmetic circuit
11, 11a and 702: Semiconductor optical waveguide
12, 15 and 703: Optical multiplexing and demultiplexing unit
13, 16 and 704: Optical phase modulator
14 and 705; Modulator region
21: Discrete driving circuit
22 and 26: Terminator
23: Branch
24: Driving circuit
25: Phase shifting circuit
100, 101 and 400: Multi-level optical modulator module
200, 300, 301 and 400: Programmable multi-level optical modulator module
701: Optical modulator

The invention claimed is:

1. An optical modulator module comprising:
an optical modulation unit including an optical waveguide which conducts an inputted optical signal, and m modulator regions (m being an integer satisfying 2≤m) which are arranged so as to align on the optical waveguide and which modulate the optical signal; and m discrete driving unit that are connected in line,
wherein
an i-th one of the m discrete driving unit (i being an integer satisfying 1≤i≤m) includes:
a driving unit that outputs a signal obtained by amplifying a signal resulting from synchronizing a digital input signal with a synchronization signal to an i-th one of the modulator regions; and a phase shift unit that outputs a signal resulting from giving a delay to a signal branched from the synchronization signal, a j-th one of the discrete driving unit (j being an integer satisfying 1≤j≤m) receives, as the synchronization signal, the signal outputted from the phase shift unit included in a (j−1) one of the discrete driving unit, and the modulator regions includes a plurality of modulation electrodes, supposing that a penetration length denoted by d is the penetration length of an electric field caused by a modulation electric signal applied to each of the modulation electrodes in a transmission direction of the optical signal, the distance between every two adjacent ones of the modulation electrodes $L_{gap}$ is given by $L_{gap}=2d$.

2. The optical modulator module according to claim 1, wherein the modulator regions have the same length.

3. The optical modulator module according to claim 1, wherein a plurality of the digital input signal whose number is 2k (k being an integer satisfying 1≤k≤m) are generated by replicating one digital signal, the 2k digital input signals are amplified, and each of the amplified signals is inputted to a corresponding one of 2k ones of the modulator regions.

4. The optical modulator module according to claim 1, wherein the modulator regions have their respective lengths which are mutually different, and further, each of the lengths is equal to a length resulting from multiplying a unit length by a power of 2.

5. The optical modulator module according to claim 1, wherein an i-th one of the modulator regions has a length equal to a length resulting from multiplying a unit length by $2^i$.

6. The optical modulator module according to claim 1, wherein a delay given by the phase shift unit included in an i-th one of the discrete driving unit is approximately equal to a time lag of signal light which passes through a distance between the midpoint of an (i−1)th one of the modulator regions and a midpoint of an i-th one of the modulator regions.

7. The optical modulator module according to claim 1, wherein the modulator regions are provided on a plurality of the optical waveguides the number of which is g (g being an integer larger than or equal to 2) and which optically connect between an optical demultiplexer having f inputs and g outputs (f being an integer larger than or equal to 2) and an optical multiplexer having g inputs and f outputs.

8. The optical modulator module according to claim 7 further comprising an electric potential fixing unit connected to a jointing portion that optically joints the optical demultiplexer having f inputs and g outputs and the optical multiplexer having g inputs and f outputs, and the modulator regions located adjacent to the optical demultiplexer having f inputs and g outputs and the optical multiplexer having g inputs and f outputs.

9. The optical modulator module according to claim 1 further comprising an arithmetic circuit for generating m time-series digital input signals from p time-series digital input signals (p being an integer satisfying 2≤p) in accordance with a preset arithmetic parameter, wherein each of the m discrete driving unit receives any one of the m time-series digital input signals.

10. A modulation method for an optical signal, comprising:
causing an i-th one of m discrete driving unit (i and m being integers satisfying 123 i≤m, and 2≤m) which are connected in line to generate a signal obtained through amplification of a signal resulting from synchronizing a digital input signal with a synchronization signal;

causing a driving circuit to output the signal obtained through amplification to an i-th one of modulator regions which are formed on an optical waveguide of an optical modulator, wherein each of the modulator regions includes a corresponding one of at least m modulation electrodes, an electric field caused by a modulation electric signal applied to each of the modulation electrodes penetrates in a transmission direction of the optical signal by a penetration length, and supposing that the penetration length is denoted by d, a distance $L_{gap}$ between every two adjacent ones of modulation electrodes is given by $L_{gap} = 2d$;

causing a phase shifting circuit to output a signal resulting from giving at least a delay to a signal branched from the synchronization signal; and inputting a signal outputted from the phase shifting circuit of a (j−1)th one of the m discrete driving unit (j being an integer satisfying 2≤j≤m) to an j-th one of the m discrete driving unit.

11. An optical modulator module comprising:

optical modulation means including an optical waveguide which conducts an inputted optical signal, and m modulator regions (m being an integer satisfying 2≤m) which are arranged so as to align on the optical waveguide and which modulate the optical signal; and m discrete driving means that are connected in line, wherein an i-th one of the discrete driving means (i being an integer satisfying 1≤i≤m) includes:

driving means for outputting a signal obtained by amplifying a signal resulting from synchronizing a digital input signal with a synchronization signal to an i-th one of the modulator regions; and phase shift means for outputting a signal resulting from giving a delay to a signal branched from the synchronization signal, a j-th one of the discrete driving means (j being an integer satisfying 1≤j≤m) receives, as the synchronization signal, the signal outputted from the phase shift means included in a (j−1)th one of the discrete driving means, and the modulator regions includes a corresponding one of a plurality of modulation electrodes, supposing that a penetration length denoted by d is the penetration length of an electric field caused by a modulation electric signal applied to each of the modulation electrodes in a transmission direction of the optical signal, the distance between every two adjacent ones of the modulation electrodes $L_{gap}$ is given by $L_{gap} = 2d$.

* * * * *